United States Patent
Grabner et al.

(10) Patent No.: US 11,435,756 B2
(45) Date of Patent: Sep. 6, 2022

(54) VISUAL ODOMETRY IN AUTONOMOUS MACHINE APPLICATIONS

(71) Applicant: NVIDIA Corporation, Santa Clara, CA (US)

(72) Inventors: Michael Grabner, Redmond, WA (US); Jeremy Furtek, San Antonio, TX (US); David Nister, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 40 days.

(21) Appl. No.: 17/108,965

(22) Filed: Dec. 1, 2020

(65) Prior Publication Data

US 2021/0165418 A1 Jun. 3, 2021

Related U.S. Application Data

(60) Provisional application No. 62/942,133, filed on Dec. 1, 2019.

(51) Int. Cl.
*G05D 1/02* (2020.01)
*G06T 7/246* (2017.01)
(Continued)

(52) U.S. Cl.
CPC ......... *G05D 1/0253* (2013.01); *G05D 1/0251* (2013.01); *G06T 7/246* (2017.01);
(Continued)

(58) Field of Classification Search
CPC .... G05D 1/0253; G05D 1/0251; G06T 7/246; G06T 7/285; G06T 7/35;
(Continued)

(56) References Cited

U.S. PATENT DOCUMENTS

| 8,463,006 B2 * | 6/2013 | Prokoski | G06T 7/0012 382/128 |
| 8,693,734 B2 * | 4/2014 | Jin | G06V 20/10 382/285 |

(Continued)

FOREIGN PATENT DOCUMENTS

| EP | 3158293 B1 * | 1/2019 | ........... B64C 39/024 |
| WO | WO-2013033442 A1 * | 3/2013 | ........ G06K 9/00201 |
| WO | WO-2020048618 A1 * | 3/2020 | ............. G06T 7/246 |

OTHER PUBLICATIONS

Lavely et al., "Model-based, multi-sensor fusion and bundle adjustment for image registration and target recognition" (Year: 2006).*

(Continued)

*Primary Examiner* — Manav Seth
(74) *Attorney, Agent, or Firm* — Taylor English Duma LLP

(57) ABSTRACT

Systems and methods for performing visual odometry more rapidly. Pairs of representations from sensor data (such as images from one or more cameras) are selected, and features common to both representations of the pair are identified. Portions of bundle adjustment matrices that correspond to the pair are updated using the common features. These updates are maintained in register memory until all portions of the matrices that correspond to the pair are updated. By selecting only common features of one particular pair of representations, updated matrix values may be kept in registers. Accordingly, matrix updates for each common feature may be collectively saved with a single write of the registers to other memory. In this manner, fewer write operations are performed from register memory to other memory, thus reducing the time required to update bundle adjustment matrices and thus speeding the bundle adjustment process.

27 Claims, 18 Drawing Sheets

(51) Int. Cl.
*G06T 7/35* (2017.01)
*G06T 7/285* (2017.01)

(52) U.S. Cl.
CPC .............. *G06T 7/285* (2017.01); *G06T 7/35* (2017.01); *G06T 2207/10021* (2013.01); *G06T 2207/10028* (2013.01); *G06T 2207/30252* (2013.01)

(58) Field of Classification Search
CPC . G06T 2207/10021; G06T 2207/10028; G06T 2207/30252
See application file for complete search history.

(56) References Cited

U.S. PATENT DOCUMENTS

| | | | | |
|---|---|---|---|---|
| 8,723,953 | B2* | 5/2014 | Klomp | H04N 7/18 348/144 |
| 8,805,110 | B2* | 8/2014 | Rhoads | H04L 67/34 455/418 |
| 9,201,424 | B1* | 12/2015 | Ogale | G06T 7/80 |
| 9,286,810 | B2* | 3/2016 | Eade | G06F 16/444 |
| 10,706,582 | B2* | 7/2020 | Chandraker | G06T 7/277 |
| 10,719,727 | B2* | 7/2020 | Stanimirovic | G06V 10/143 |
| 10,885,698 | B2 | 1/2021 | Muthler et al. | |
| 11,276,191 | B2* | 3/2022 | Lukierski | G06T 7/55 |
| 2018/0348785 | A1* | 12/2018 | Zheng | G06K 9/6274 |
| 2019/0385339 | A1* | 12/2019 | Zhao | G01C 25/005 |
| 2020/0279121 | A1* | 9/2020 | Stanimirovic | G06V 10/143 |
| 2020/0334841 | A1* | 10/2020 | Cristobal | G06T 7/74 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

Engels, C., et al., "Bundle Adjustment Rules", Photogrammetric Computer Vision, pp. 1-6 (Sep. 20, 2006).

IEC 61508, "Functional Safety of Electrical/Electronic/Programmable Electronic Safety-related Systems (E/E/PE, or E/E/PES)," Retrieved from Internet URL: https://en.wikipedia.org/wiki/IEC_61508, accessed on Apr. 1, 2022, 7 pages.

ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.

* cited by examiner

VISUAL ODOMETRY IN AUTONOMOUS MACHINE APPLICATIONS

CROSS REFERENCE TO RELATED APPLICATION

This application claims the benefit of U.S. Provisional Patent Application No. 62/942,133, filed Dec. 1, 2019, the disclosure of which is hereby incorporated by reference herein in its entirety.

BACKGROUND

Embodiments of the disclosure relate generally to parallel processor systems. More specifically, embodiments of the disclosure relate to parallel processor based visual odometry systems.

SUMMARY

In various applications, it is desirable to be able to determine the pose, or location and orientation, of a camera or other image sensor solely from images such camera or sensor may generate. For example, modern autonomous vehicles are often equipped with sensors (such as cameras for example and without limitation) for viewing or perceiving vehicle environments. The sensors assist the vehicle in detecting various environmental features for aid in vehicle navigation, path planning, and the like. In some applications, it is desirable to determine the relative movement of the sensor devices solely from output, rather than from other vehicle systems such as a global positioning system (GPS) or the like. One method of accomplishing this is to determine sensor poses via use of a bundle adjustment process. Bundle adjustment methods are nonlinear optimization processes that may be used to determine both poses (e.g., positions and orientations) of a sensor and feature spatial locations from a set of output produced from that sensor.

However, conventional bundle adjustment processes present certain challenges. For example, bundle adjustment processes are computationally intensive, and can be difficult to perform with sufficient speed to determine (e.g., camera) poses and feature locations for real time applications. Present bundle adjustment processes consume computing resources, including, for example, power, processing cycles, processor time, memory (e.g., register, cache, buffer, RAM, ROM, flash) space, bus traffic, among others that may be better used for other operations.

Accordingly, systems and methods are described herein for more rapidly and efficiently performing bundle adjustment processes. In some embodiments, bundle adjustment processing is carried out on one or more processors having a parallel processing architecture, so that different portions of the bundle adjustment process may be carried out in parallel. In some embodiments, it is also beneficial to update portions of bundle adjustment matrices on a per-image-pair basis. That is, pairs of representations (e.g., images) from sensor data generated using one or more sensors (e.g., cameras) are selected, and features common to both representations of the pair are also selected. Each of these common features is used to update the appropriate bundle adjustment matrices, with updates to the adjustment matrices saved to register memory. That is, by selecting only common features of one particular pair of representations, updated matrix values may be kept in registers. Accordingly, matrix updates for each common feature may be collectively saved with a single write of the registers to other, e.g., off-chip memory, rather than a more conventional write of the register contents to memory after each updated matrix value is determined. In this manner, fewer write operations are performed from register memory to other memory, thus reducing the time required to update bundle adjustment matrices and thus speeding the bundle adjustment process. In particular, implementation of processes of embodiments of the disclosure, on sufficient parallel processors, may result in the ability to perform bundle adjustment, and thus determine camera poses and feature spatial locations, substantially in real time.

To further increase the speed at which bundle adjustment processes may be performed, embodiments of the disclosure contemplate storage of identified features in such a manner as to allow coalesced read and write operations to be performed by the processing elements that carry out updates to bundle adjustment matrices. In particular, processing threads may be dedicated for processing of particular features, and features may be stored in the processor memory allocated for their particular threads. In other words, threads next to each other may access memory locations next to each other, where those memory locations store feature information for the features that they have been allocated. In this manner, successive features are stored at successive memory locations corresponding to their allocated threads, so that neighboring threads access neighboring memory locations. By allowing coalesced read and write operations, memory access time is reduced, thus further increasing the speed at which bundle adjustment may be performed.

In some embodiments of the disclosure, common features may be employed to update any appropriate matrices used in bundle adjustment, including one or more Hessian matrices. In such embodiments, portions of the Hessian matrices may correspond to common features of a particular pair of images. Different processing elements of a graphics processing unit (GPU) may thus be allocated to processing different portions of Hessian matrices, so that common features of particular image pairs may each be processed by a dedicated processing element.

In some embodiments of the disclosure the above described image features may be any features that may be determined from an image. As one example, the features may each be determined points of an image.

Common features may be determined in any suitable manner. As one example, features of each image captured by cameras of embodiments of the disclosure may be identified, and assigned a particular location within a list. Each new identified feature may be assigned a new position in the list, and features already identified in previous images are assigned the same list position. Accordingly, when a pair of images is selected, their lists may be compared to determine common elements, i.e., common list positions each corresponding to the same identified feature.

In accordance with some embodiments of the disclosure, bundle adjustment may be performed in more efficient and faster manner, by identifying features common to both images of a particular pair, and updating all corresponding values of bundle adjustment matrices. As the only matrix values updated are those corresponding to a particular image pair, update values may be held in register memory and only written to another memory after all updated matrix values for that particular image pair are determined. Only a single memory write operation is thus required for each image pair, increasing the speed at which bundle adjustment may be performed, i.e., the speed at which camera poses and feature locations may be determined.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for performing visual odometry more rapidly. Image pairs from one or more cameras are selected, and features common to both images of the pair are identified. Each of these common features may be used in a bundle adjustment process. In particular, portions of bundle adjustment matrices that correspond to the image pair are updated using common features. These updates are maintained in register memory until all portions of the matrices that correspond to the image pair are updated. That is, by selecting only common features of one particular pair of images, updated matrix values may be kept in registers. Accordingly, matrix updates for each common feature may be collectively saved with a single write of the registers to other, e.g., more persistent, memory, rather than a more conventional write of the register contents to memory after each updated matrix value is determined. In this manner, fewer write operations are performed from register memory to other memory, thus reducing the time required to update bundle adjustment matrices and thus speeding the bundle adjustment process.

Additionally, in some embodiments of the disclosure, as image features are determined, they are stored in successive or consecutive memory locations. Consecutive threads of a parallel processor may then be allocated for each consecutive feature, so that consecutive threads access consecutive memory locations for their respective thread information. Accordingly, common features are processed by parallel threads, with each thread performing coalesced read and write operations. Some embodiments of the disclosure thus achieve further speed and efficiency through parallel processing of features and coalesced read/write operations.

Figure 1:
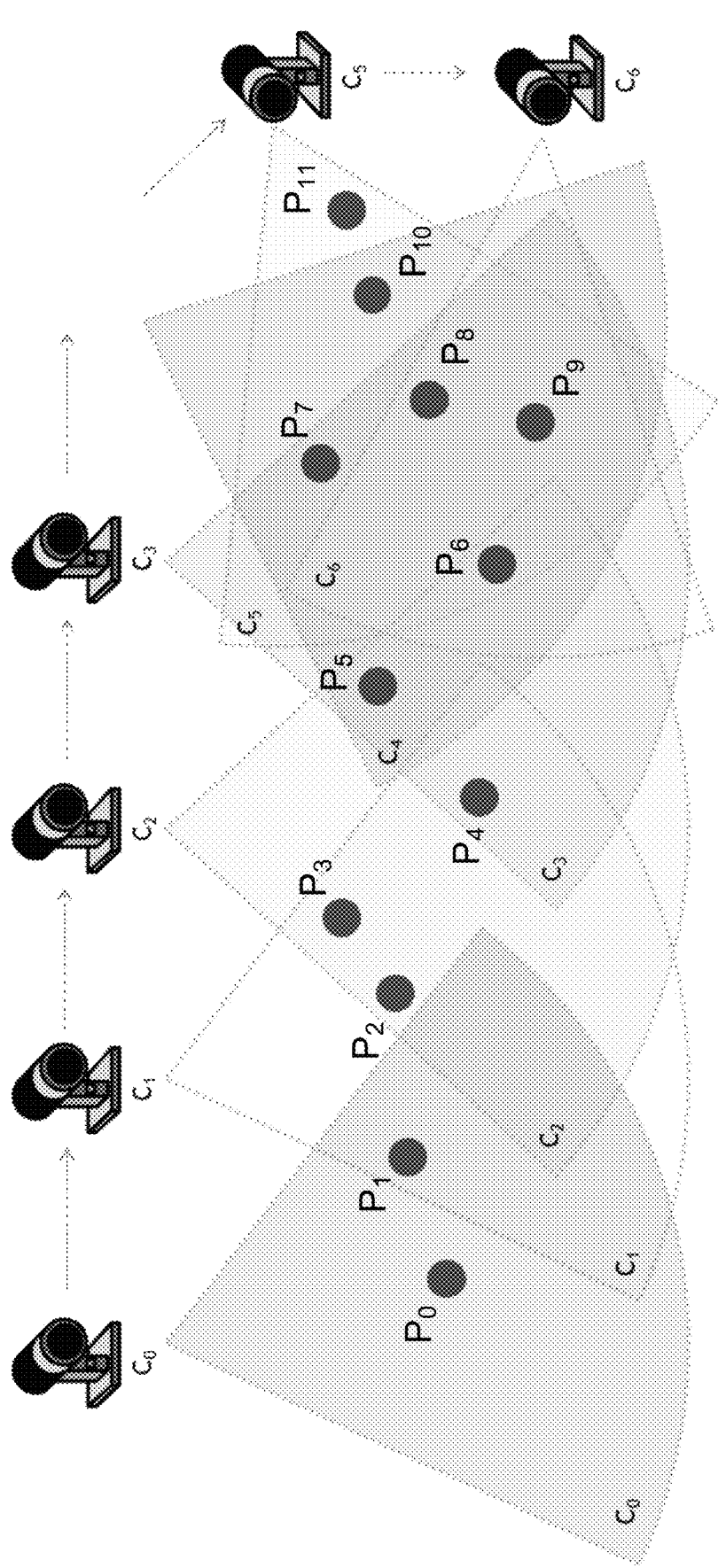
FIG. 1 conceptually illustrates exemplary systems and methods for performance of rapid visual odometry, according to embodiments of the disclosure.

FIG. 1 conceptually illustrates exemplary systems and methods for performance of rapid visual odometry, according to embodiments of the disclosure. A camera C may move through space, such as when it is affixed to a vehicle. While doing so, camera C may capture images $C_0, \ldots, C_6$. Here, six images are shown for purposes of illustration, but camera C may capture any number of images. These images may contain features $P_0, \ldots, P_{11}$ identified by the vehicle or another computing system. It may be observed that a number of features appear in more than one image. For example, feature $P_1$ appears in images $C_0$ and $C_1$, and feature $P_7$ appears in both images $C_3$ and $C_4$. Accordingly, embodiments of the disclosure may employ a bundle adjustment process to determine the poses of camera C when each image $C_0, \ldots, C_6$ was taken, as well as the spatial location of each feature $P_0, \ldots, P_{11}$.

Embodiments of the disclosure contemplate use of any bundle adjustment process. In some embodiments of the disclosure, an exemplary bundle adjustment process seeks to minimize a cost function c(x) according to:

$$H_c(x)dx = -\nabla c(x) \qquad (1)$$

where Hc(x) is a Hessian matrix:

$$H_c(x) = \begin{bmatrix} \frac{\partial^2 c}{\partial x_1 \partial x_1}(x) & \cdots & \frac{\partial^2 c}{\partial x_1 \partial x_M}(x) \\ \vdots & \ddots & \vdots \\ \frac{\partial^2 c}{\partial x_N \partial x_1}(x) & \cdots & \frac{\partial^2 c}{\partial x_N \partial x_M}(x) \end{bmatrix}.$$

The cost function c(x) may be a square sum of the dimensions of an N-dimensional error vector function $f(x)$:

Employing a Gauss-Newton approximation of the Hessian $H_C(x)$ as a first order Taylor expansion of $f(x)$ produces:

$$c(x) = f(x)^T f(x).$$

where $J_f(x)$ is the Jacobian:

$$J_f(x) = \begin{bmatrix} \frac{\partial f_1}{\partial x_s}(x) & \cdots & \frac{\partial f_1}{\partial x_M}(x) \\ \vdots & \vdots & \vdots \\ \frac{\partial f_N}{\partial x_1}(x) & \cdots & \frac{\partial f_N}{\partial x_M}(x) \end{bmatrix}$$

of $f$ at x. Setting the parameters x as the feature location parameters followed by the camera parameters produces a Jacobian of the following structure:

$$J_f = [J_P J_C],$$

where $J_P$ is the Jacobian of the error vector f with respect to the feature location parameters, and $J_C$ is the Jacobian of the error vector f with respect to the camera parameters. This produces the following approximation of the Hessian:

$$H = \begin{bmatrix} J_P^T J_P & J_P^T J_C \\ J_C^T J_P & J_C^T J_C \end{bmatrix},$$

so that equation (1) reduces to:

$$\begin{bmatrix} H_{PP} & H_{PC} \\ H_{PC}^T & H_{CC} \end{bmatrix} \begin{bmatrix} dP \\ dC \end{bmatrix} = \begin{bmatrix} b_P \\ b_C \end{bmatrix}, \quad (2)$$

where $H_{PP}=J_P^T J_P$, $H_{PC}=J_P^T J_C$, $H_{CC}=J_C^T J_C$, $b_P=-J_P^T f$, $b_c=J_C^T f$, and dP and dC represent the update of the feature parameters and the camera parameters, respectively. As $H_{PP}$ and $H_{CC}$ are block-diagonal, equation (2) may be rewritten as:

$$\underbrace{(H_{CC} - H_{PC}^T H_{PP}^{-1} H_{PC})}_{A} dC = \underbrace{b_C - H_{PC}^T H_{PP}^{-1} b_P}_{B} \quad (3)$$

Accordingly, A dC=B may be solved for dC, to determine the updated camera parameters. In some embodiments, dC may be solved via a dense Cholesky Factorization. The updated feature parameters dP may then be determined according to:

$$dP = H_{PP}^{-1} b_P - H_{PP}^{-1} H_{PC} dC.$$

Updated feature and camera parameters may then be stored for use as desired. The above described bundle adjustment process is known and described in, for example, Engels et al., *Bundle Adjustment Rules*, PHOTOGRAMMETRIC COMPUTER VISION 2 2006, which is hereby incorporated by reference in its entirety.

When feature locations and camera poses are assigned as the x variables, it may be observed that blocks of the A matrix of (3) correspond to specific image pairs, and values of these blocks may be functions of the features common to both images of the pair. In particular, each image pair corresponds to a row of blocks of $H_{PC}^T$, and a column of blocks of $H_{PC}$. Accordingly, a single block of A may be updated by selecting a pair of images $C_n$ captured by camera C, identifying features P common to both, and calculating new or updated block values from these common features. Accordingly, pairs of the images $C_0, \ldots, C_6$ may be selected, and the points P common to the pair of selected images may be used to update the portion of A corresponding to at image pair. For example, images $C_1$ and $C_2$ may be selected, which in some embodiments would correspond to 6×6 row block 1 and column block 2 of A, which may be referred to as $A_{12}$. The features common to images $C_1$ and $C_2$, i.e., features $P_2$, $P_3$, and $P_4$, may then be used to update values of Au.

As a single block $A_{ij}$ of the A matrix is a 6×6 array of values in some embodiments, many processors may have sufficient register memory to retain each value of $A_{ij}$ in registers as it is updated. Accordingly, updating values of the A matrix by image pair allows for selection of sufficiently small portions of A that all A values of this portion may be retained in register memory during the update process, and only written to other memory such as off-chip memory, or memory external to the processor containing the registers retaining values of A, when the update corresponding to that image pair is complete. In this manner, fewer write operations can be performed. In some embodiments, this produces a significant reduction in the time taken by the update process, and thus the time taken by performance of bundle adjustment.

Further efficiency may be achieved in some embodiments of the disclosure by storing the determined features P in sequential memory locations. More specifically, if bundle adjustment processes of embodiments of the disclosure are executed on a parallel processor, a separate thread may be dedicated for processing of each feature and determining its update values. In such an arrangement, it is beneficial to store features for coalesced read and write operations to be performed. That is, adjacent threads may read from and write to adjacent memory locations. Thus, determined features may be stored in adjacent memory locations, and assigned to adjacent threads. These threads may then retrieve their stored feature data in coalesced manner, further decreasing the time required for memory access and increasing the speed at which bundle adjustment may be performed.

Figure 2A:
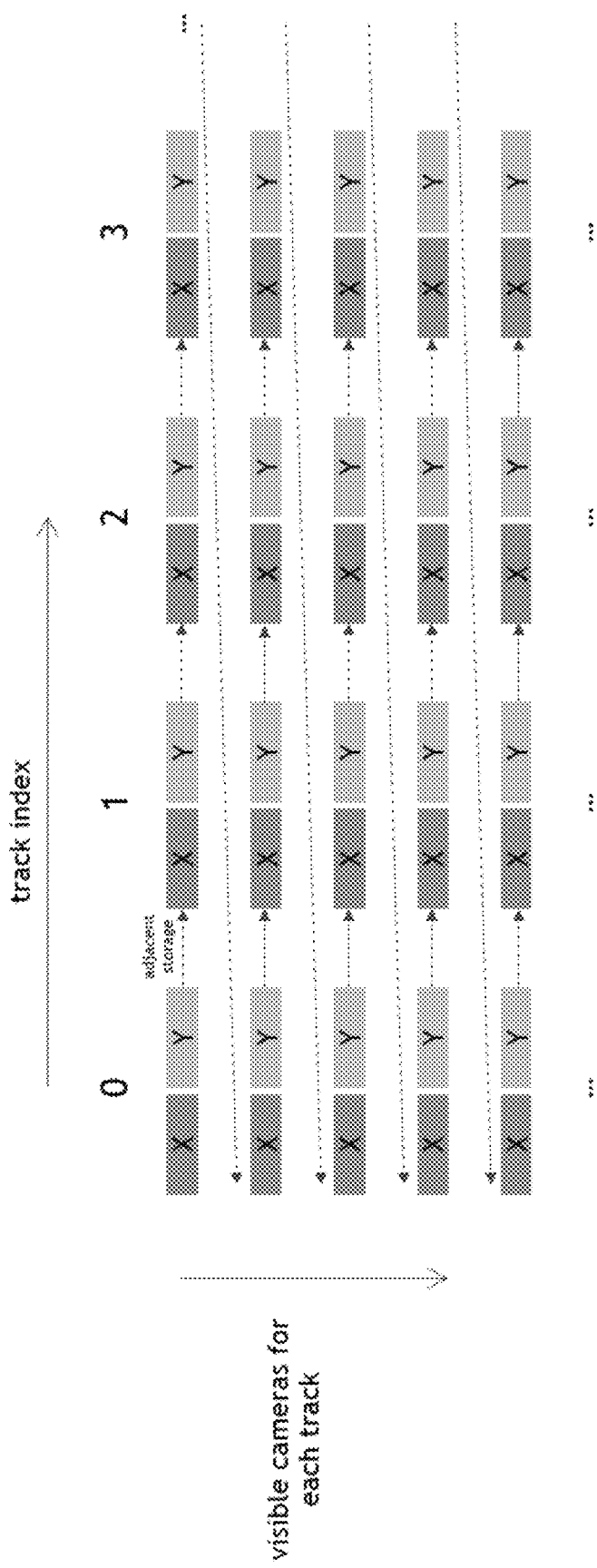
FIGS. 2A-2C illustrate feature storage for facilitation of coalesced memory access operations, according to embodiments of the disclosure.
Figure 2B:
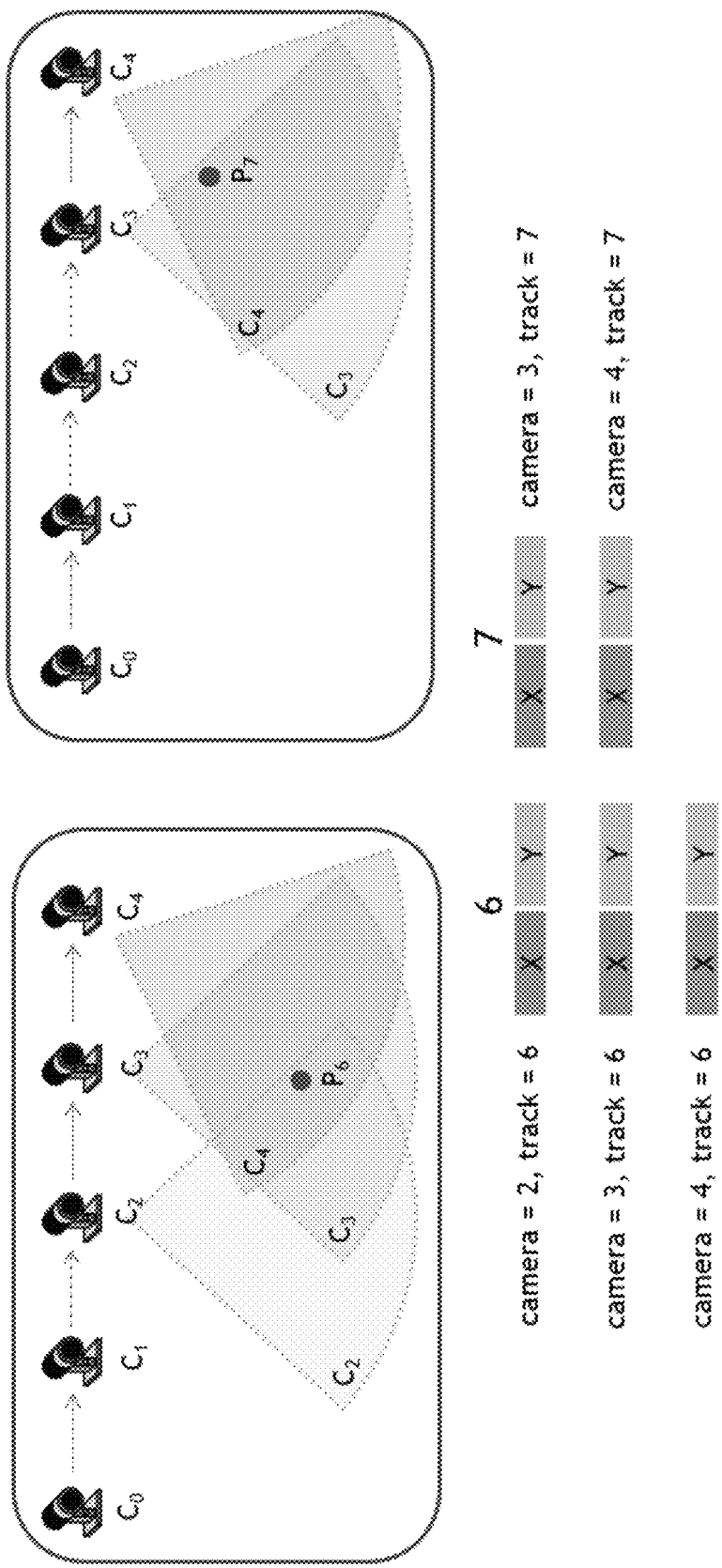
Figure 2C:
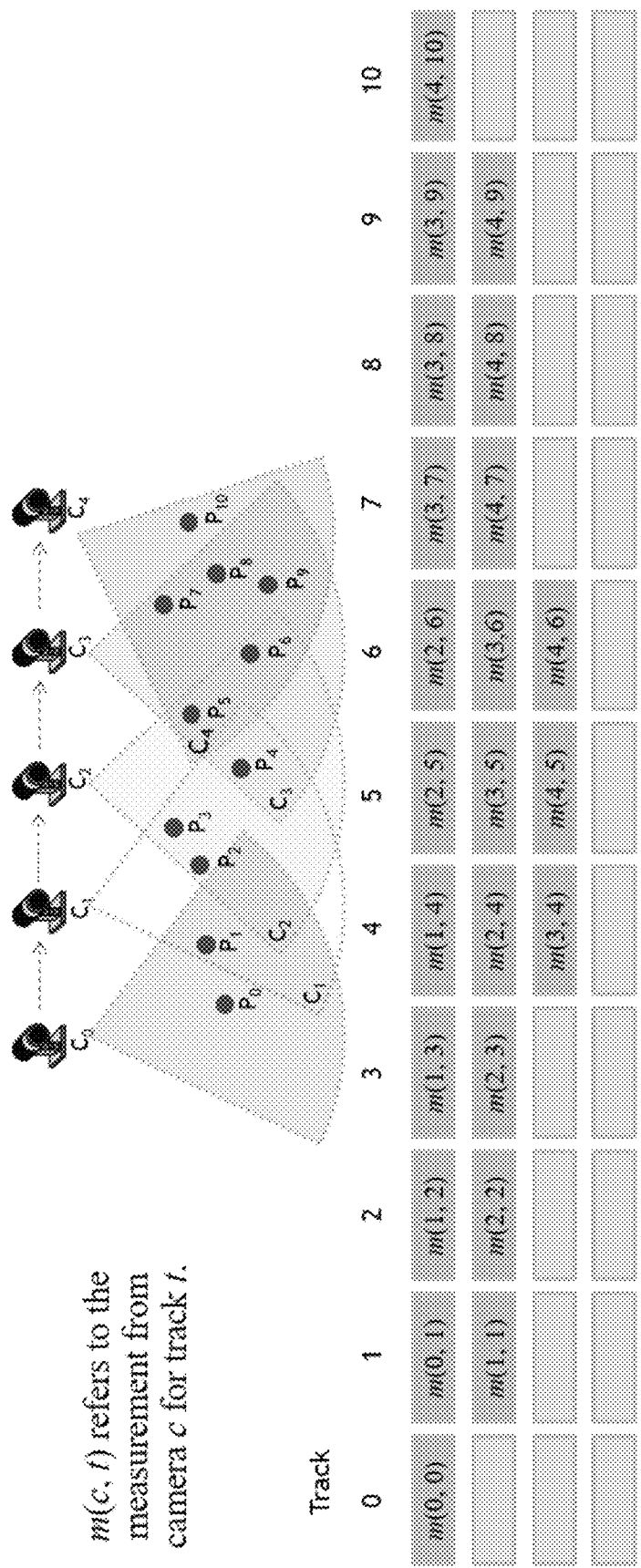

FIGS. 2A-E illustrate feature storage for facilitation of coalesced memory access operations, according to embodiments of the disclosure. With reference to FIGS. 2A-2C, identified features P may be stored by feature and by track. More specifically, each distinct feature may be stored in its own memory column, with each separate instance of a particular feature being stored in adjacent locations along the same column. Thus, each column of memory stores the various detected instances of the same feature, allowing each track to access a single column, and adjacent tracks to access adjacent features. As shown in FIG. 2A, each column of memory corresponds to a particular processing track, and thus stores information for one particular identified feature. Features are stored in successive adjacent columns as they are identified, and a separate track is allocated for each feature. Thus, each column of memory may be thought of as dedicated for a particular track, as shown by the track index label above each column. In particular, each column of memory stores the different (x, y) locations of one feature P that is identified in various images, with successive appearances of a feature P being appended to the same column. In this manner, each column contains the (x, y) locations of a single feature identified from different (successive) camera images.

FIG. 2B illustrates an example of such storage processes. As shown, each of images $C_2$, $C_3$, and $C_4$ capture feature $P_6$, and each of images $C_3$ and $C_4$ also capture feature $P_7$. That is, feature $P_6$ is identified in images $C_2$, $C_3$, and $C_4$, while feature $P_7$ is identified in both images $C_3$ and $C_4$. Accordingly, each instance of feature $P_6$ is stored in adjacent memory locations of the same column of memory, for access by a single track. Similarly, each instance of feature $P_7$ is stored in adjacent memory locations of the next column. Thus, individual features are stored in adjacent columns as they are identified, with each successively identified instance of a particular feature appended to its assigned column. In this manner, each column stores instances of the same feature P, in the order they are detected. For example, in FIG. 2B, the leftmost column of memory stores the (x, y) image locations of each identified instance of feature $P_6$, as it is detected and identified. The leftmost column thus stores the (x, y) locations of feature $P_6$ from images $C_2$, $C_3$, and $C_4$ in order, in adjacent memory locations within that column. Similarly, the rightmost column of memory stores the (x, y)

locations of each identified instance of feature $P_7$. In this case, as feature $P_7$ is identified in images $C_3$ and $C_4$, the rightmost column first stores the (x, y) locations of feature $P_7$ as identified in image $C_3$, followed by the (x, y) locations of feature $P_7$ in image $C_4$.

FIG. 2C provides a more concrete example of this process. With reference to FIG. 1, features $P_0, \ldots, P_{10}$ are successively captured and identified by camera C in images $C_0, \ldots, C_4$. One memory column is dedicated to storage of each of these features, with each successive identified feature stored in adjacent memory columns. Consecutive tracks are also allocated for each feature. Thus, tracks 0-10 are allocated for processing of each of features $P_0$-$P_{10}$ respectively. In FIG. 2C, each memory column is thus labeled with its associated track. Thus, for example, as feature $P_0$ appears in only a single image $C_0$, the memory column allocated for track 0 contains only a single entry, the (x, y) location of feature $P_0$ within image $C_0$. As another example, feature $P_4$ is identified within each of images $C_2$, $C_3$, and $C_4$. Accordingly, track 4 is allocated for processing of feature $P_4$ if necessary, and the identified instances of $P_4$ are stored in the memory column associated with track 4. In particular, the (x, y) locations of feature $P_4$ within images $C_2$, $C_3$, and $C_4$ are stored in consecutive column addresses of the memory column associated with track 4, as shown. This process may be repeated for each identified feature P and each captured image, with each detected instance of a particular feature $P_i$ stored at consecutive column addresses of the memory column associated with track i. In this manner, consecutive tracks 0, n may access feature information stored in consecutive memory columns 0, n, resulting in coalesced read operations.

Figure 3:
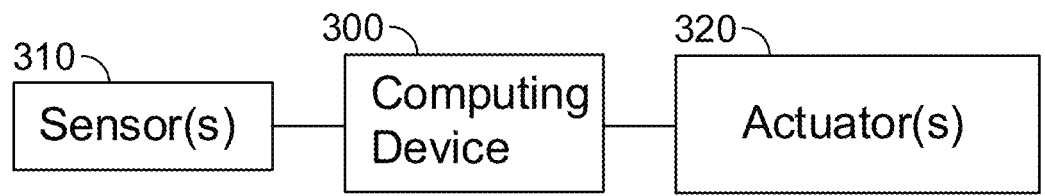
FIG. 3 is a block diagram of an exemplary system for performing rapid visual odometry, according to embodiments of the disclosure.

FIG. 3 is a block diagram of an illustrative system constructed for use according to embodiments of the disclosure. Here, the system comprises a computing device 300, one or more sensors 310, and one or more actuators 320. Computing device 300, which may be any electronic computing device containing processing circuitry capable of carrying out the bundle adjustment operations of embodiments of the disclosure, is in electronic communication with both a number of sensors 310 and actuators 320. In operation, sensors 310, which may correspond to one or more cameras C of FIG. 1, may capture and transmit any desired images to computing device 300, which then carries out the above described bundle adjustment processes, determining from the output of sensors 310 camera or sensor poses and feature spatial locations. These may correspond to the system position or pose, and locations of objects in the system's environment, respectively. Commands governing actuators 320 may then be determined from this information. The computing device 300 transmits these commands to actuators 320, which actuate the system.

The feedback control system of FIG. 3 may be any system capable of actuation in response to an input to any of its sensors. As one example, the system of FIG. 3 may be a robotic actuator capable of actuation according to its position and the positions of objects in its environment. As another example, the system of FIG. 3 may be an autonomous vehicle or robotic machine capable of self-directed driving in response to a path calculated from its environment and a desired destination, capable of actuation of its propulsion and steering mechanisms in response to driver input, or the like. One such exemplary autonomous vehicle may be autonomous vehicle 400 described in connection with FIGS. 4A-4D and FIG. 5.

Figure 4A:
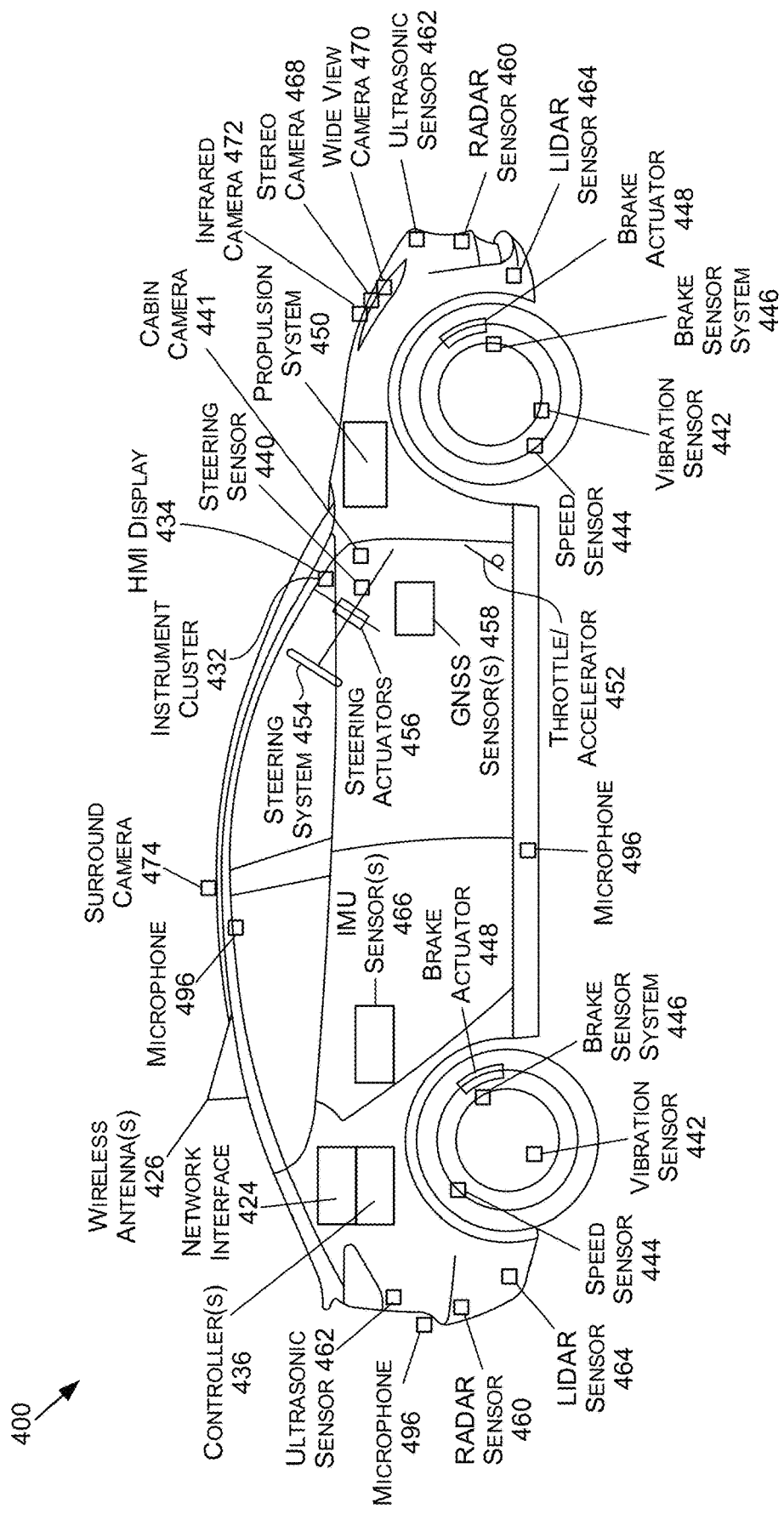
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard, each of which are hereby incorporated by reference in their entireties). The vehicle 400 may be capable of functionality in accordance with one or more of Level 3-Level 5 of the autonomous driving levels. For example, the vehicle 400 may be capable of conditional automation (Level 3), high automation (Level 4), and/or full automation (Level 5), depending on the embodiment.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more CPU(s), system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, and/or to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) 446 (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the location of the vehicle 400, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424, which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
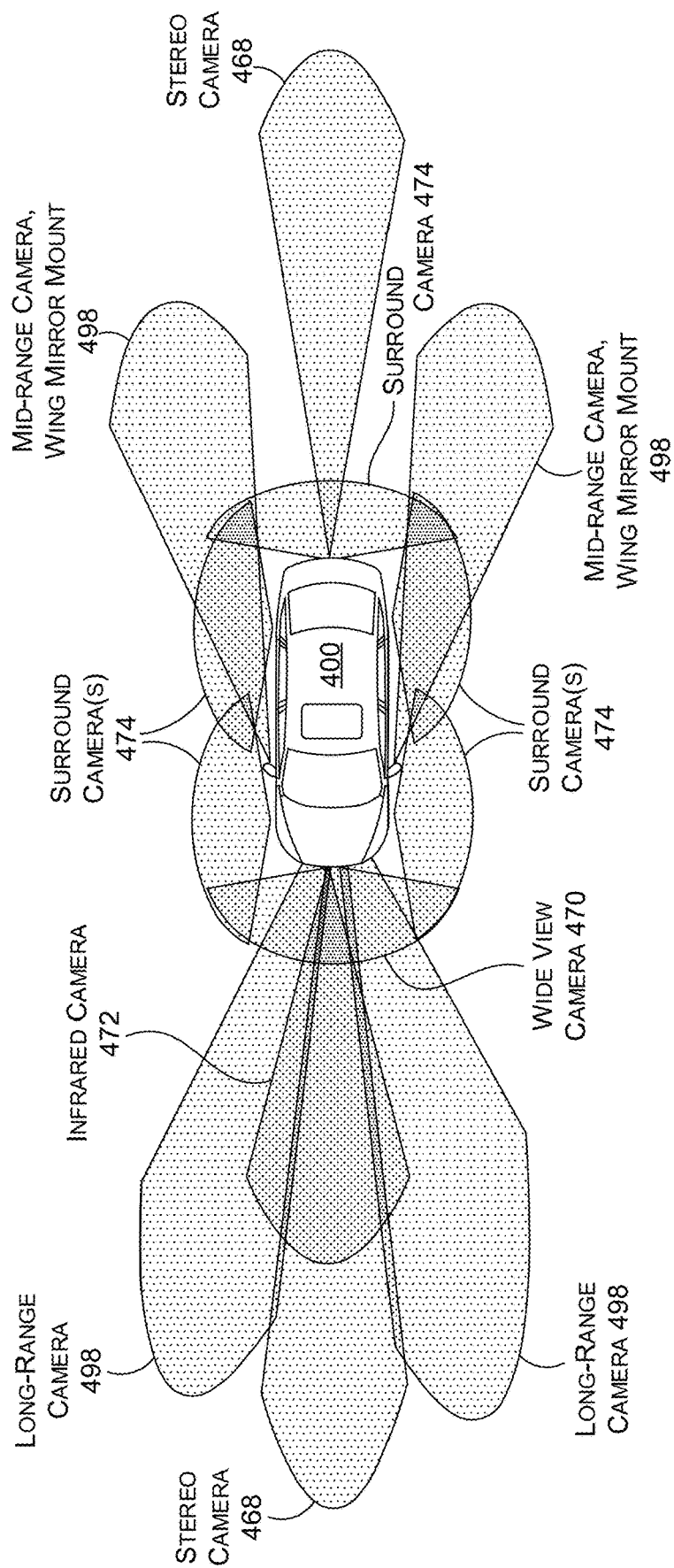
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 400 (e.g., front-facing cameras) may be used for surround view, to help identify forward-facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (e.g., FPGA) and a multi-core microprocessor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that includes portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned around the vehicle 400. The surround camera(s) 474 may include wide-view camera(s) 470, fisheye camera(s), 360-degree camera(s), and/or the like. For example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround-view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Cameras with a field of view that include portions of the interior or cabin of vehicle 400 may be used to monitor one or more states of drivers, passengers, or objects in the cabin. Any type of camera may be used including, but not limited to, cabin camera(s) 441, which may be any type of camera described herein, and which may be placed anywhere on or in vehicle 400 that provides a view of the cabin or interior thereof. For example, cabin camera(s) 441 may be placed within or on some portion of the vehicle 400 dashboard, rear view mirror, side view mirrors, seats, or doors and oriented to capture images of any drivers, passengers, or any other object or portion of the vehicle 400.

Figure 4C:
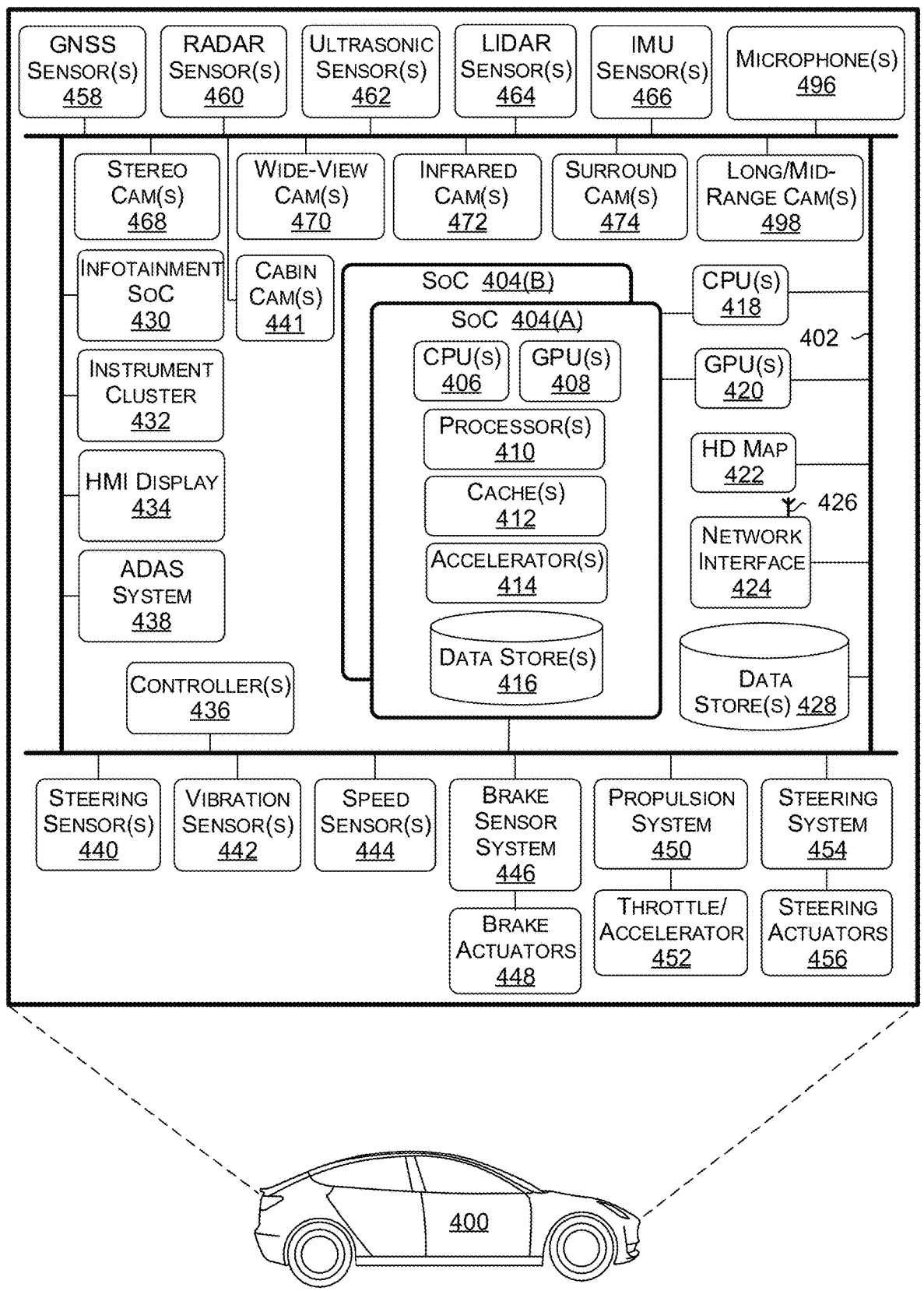
FIG. 4C is a block diagram of an example system architecture for the example autonomous vehicle of FIG. 4A, in accordance with some embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C is illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400 and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use computer-based application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting, and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected to both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 416 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe-stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and actively performing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always-on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, which use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include an SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428, which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458 (e.g., GPS and/or assisted GPS sensors), to assist in mapping, perception, occupancy grid generation, and/or path planning functions. Any number of GNSS sensor(s) 458 may be used, including, for example and without limitation, a GPS using a USB connector with an Ethernet to serial (RS-232) bridge. The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data, in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 400 at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 460 m (front) or 80 m (rear), and a field of view of up to 42 degrees (front) or 450 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 100 m, with an accuracy of 2 cm-3 cm, and with support for a 100 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include an SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjusts the vehicle speed to maintain a safe distance from vehicles ahead. Lateral ACC performs distance keeping, and advises the vehicle 400 to change lanes when necessary. Lateral ACC is related to other ADAS applications such as LC and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 400), while the I2V communication concept provides information about traffic farther ahead. CACC systems may include either or both I2V and V2V information sources. Given the information of the vehicles ahead of the vehicle 400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network that is trained and thus reduces the risk of false positives, as described herein.

The vehicle 400 may further include the infotainment SoC 430 (e.g., an in-vehicle infotainment system (IVI)). Although illustrated and described as an SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 400. For example, the infotainment SoC 430 may include radios, disk players, navigation systems, video players, USB and Bluetooth connectivity, carputers, in-car entertainment, Wi-Fi, steering wheel audio controls, hands-free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe-stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
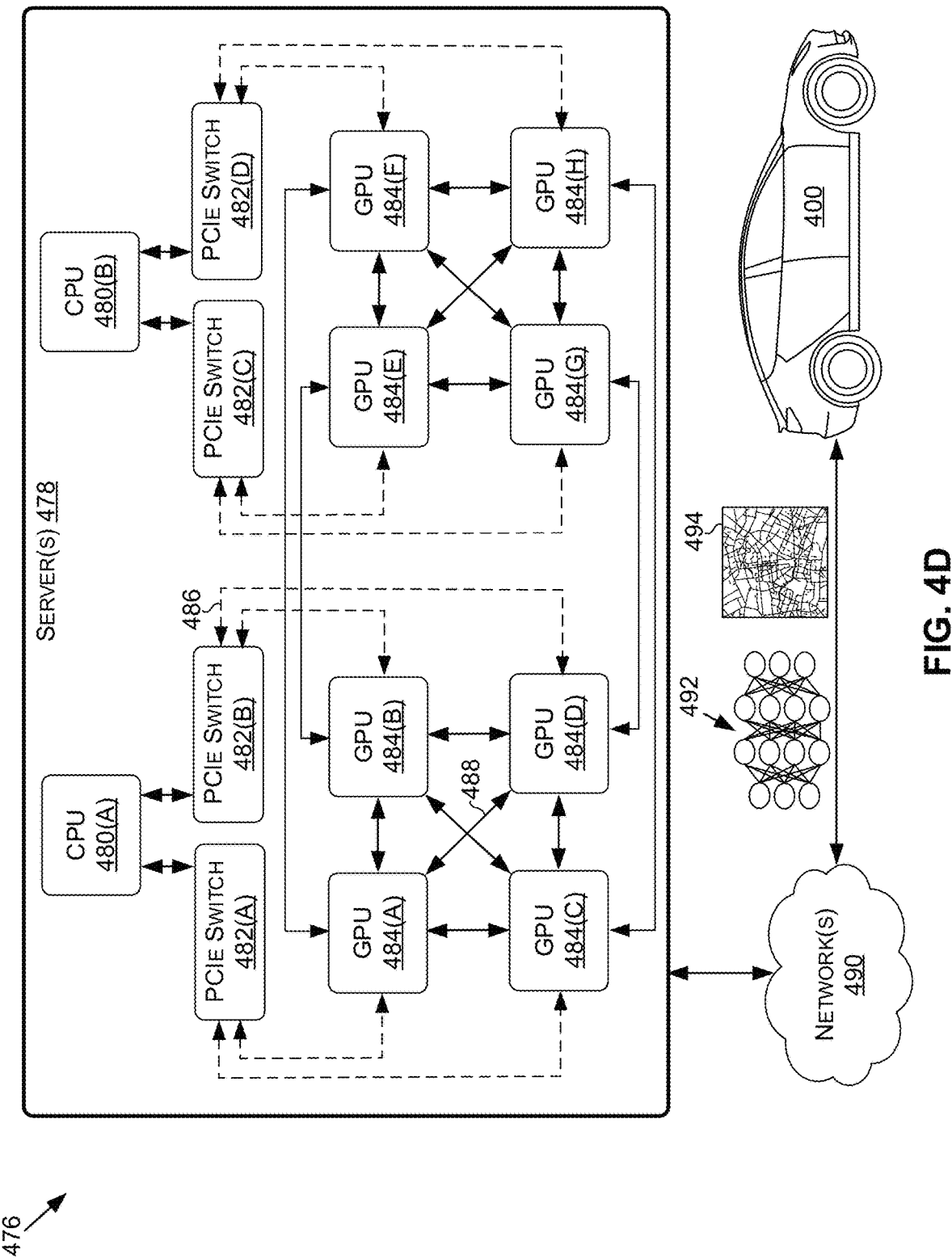
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced roadwork. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 5:
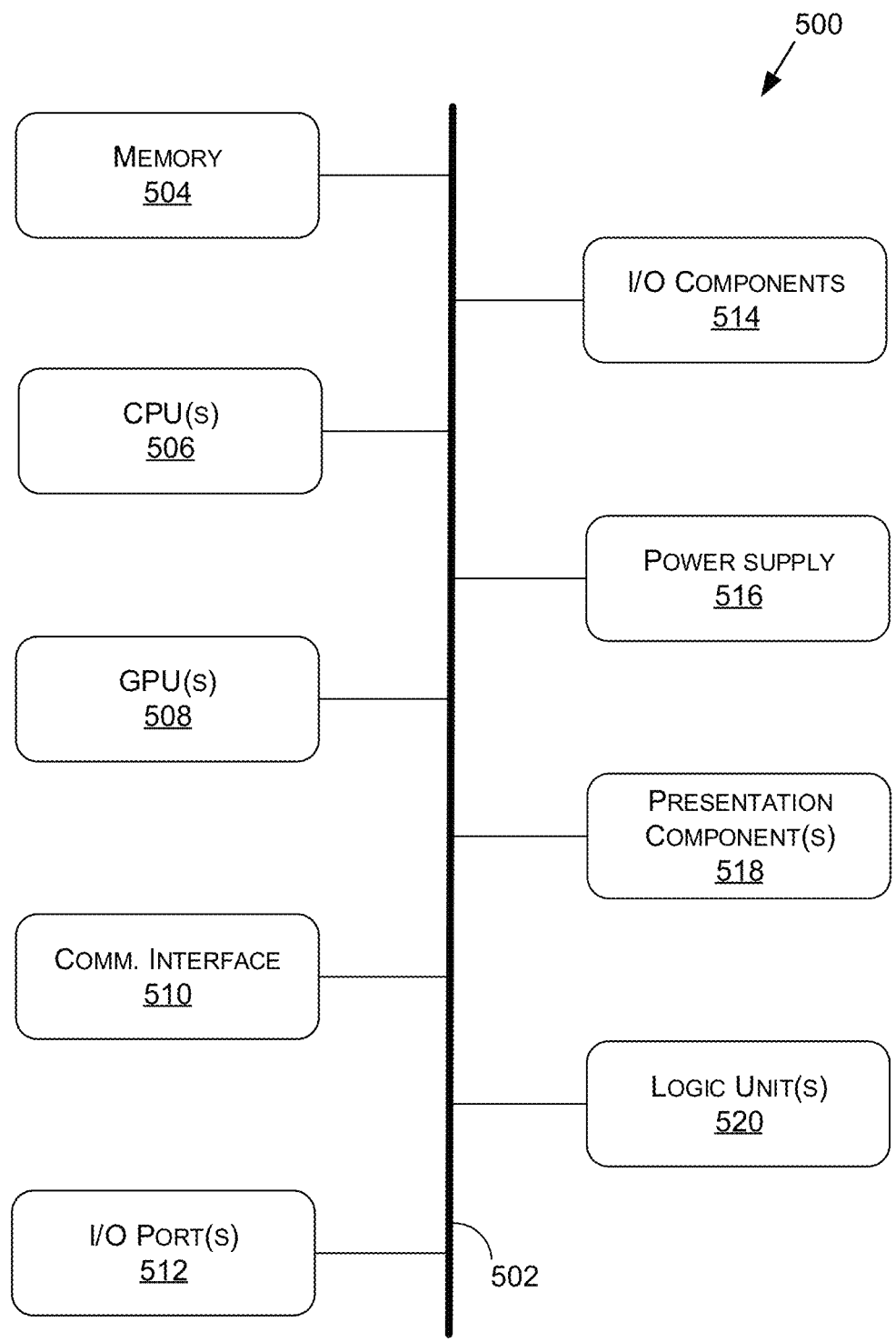
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, I/O ports 512, input/output components 514, a power supply 516, one or more presentation components 518 (e.g., display(s)), and one or more logic units 520.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, including wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built into (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Figure 6A:
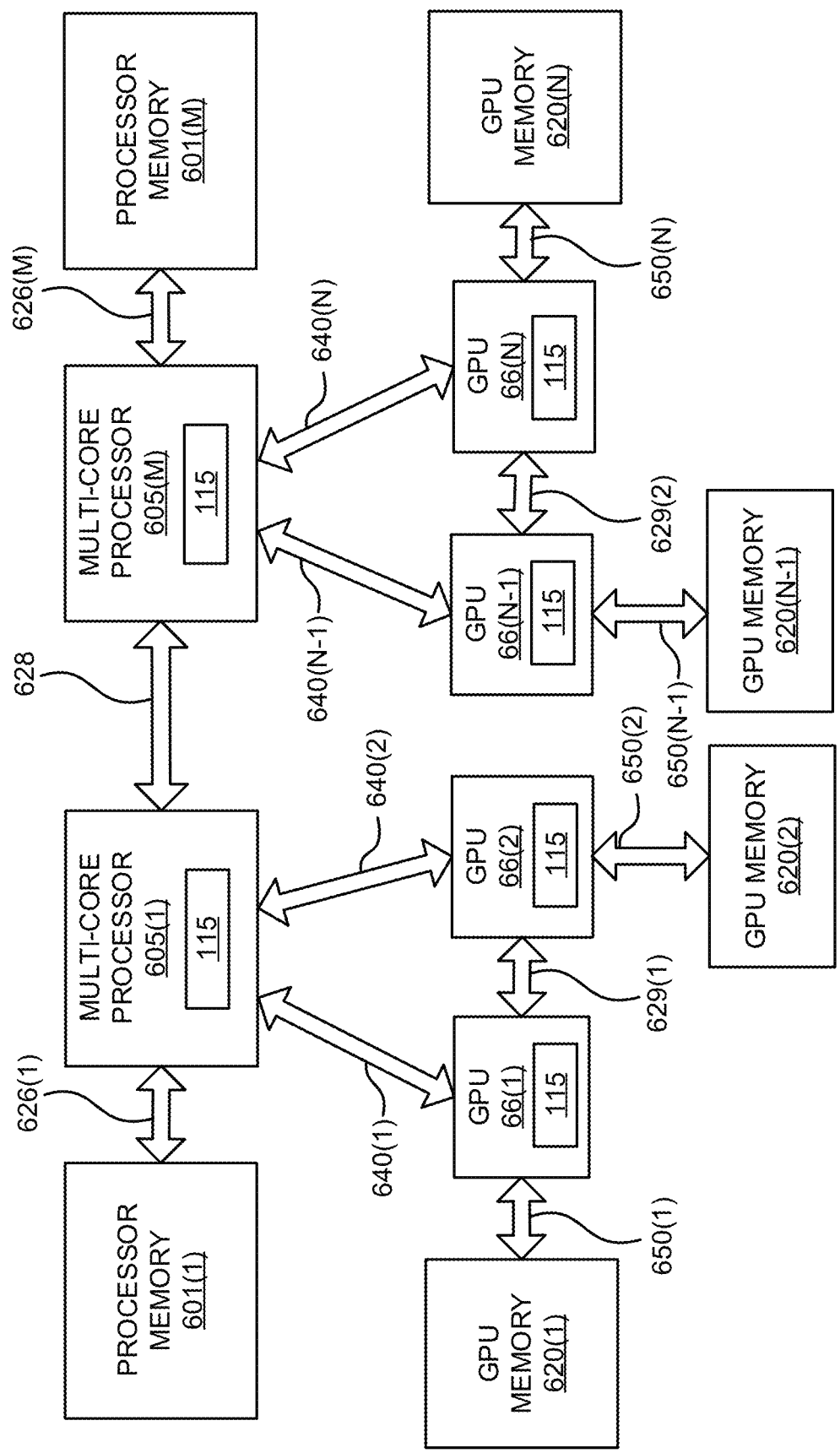
FIGS. 6A-6D each illustrate an exemplary computer system for use in implementing some embodiments of the present disclosure.

FIG. 6A illustrates an exemplary architecture in which a plurality of GPUs 610(1)-610(N) is communicatively coupled to a plurality of multi-core processors 605(1)-605(M) over high-speed links 640(1)-640(N) (e.g., buses, point-to-point interconnects, etc.). In at least one embodiment, high-speed links 640(1)-640(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 610 are interconnected over high-speed links 629(1)-629(2), which may be implemented using similar or different protocols/links than those used for high-speed links 640(1)-640(N). Similarly, two or more of multi-core processors 605 may be connected over a high-speed link 628 which may be symmetric multi-processor (SMP) buses operating at 20 GB/s, 30 GB/s, 120 GB/s or higher. Alternatively, all communication between various system components shown in FIG. 6A may be accomplished using similar protocols/links (e.g., over a common interconnection fabric).

In at least one embodiment, each multi-core processor 605 is communicatively coupled to a processor memory 601(1)-601(M), via memory interconnects 626(1)-626(M), respectively, and each GPU 610(1)-610(N) is communicatively coupled to GPU memory 620(1)-620(N) over GPU memory interconnects 650(1)-650(N), respectively. In at least one embodiment, memory interconnects 626 and 650 may utilize similar or different memory access technologies. By way of example, and not limitation, processor memories 601(1)-601(M) and GPU memories 620 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 601 may be volatile memory and another portion may be non-volatile memory (e.g., using a two-level memory (2LM) hierarchy).

As described herein, although various multi-core processors 605 and GPUs 610 may be physically coupled to a particular memory 601, 620, respectively, and/or a unified memory architecture may be implemented in which a virtual system address space (also referred to as "effective address" space) is distributed among various physical memories. For example, processor memories 601(1)-601(M) may each comprise 64 GB of system memory address space and GPU memories 620(1)-620(N) may each comprise 32 GB of system memory address space resulting in a total of 256 GB addressable memory when M=2 and N=4. Other values for N and M are possible.

Figure 6B:
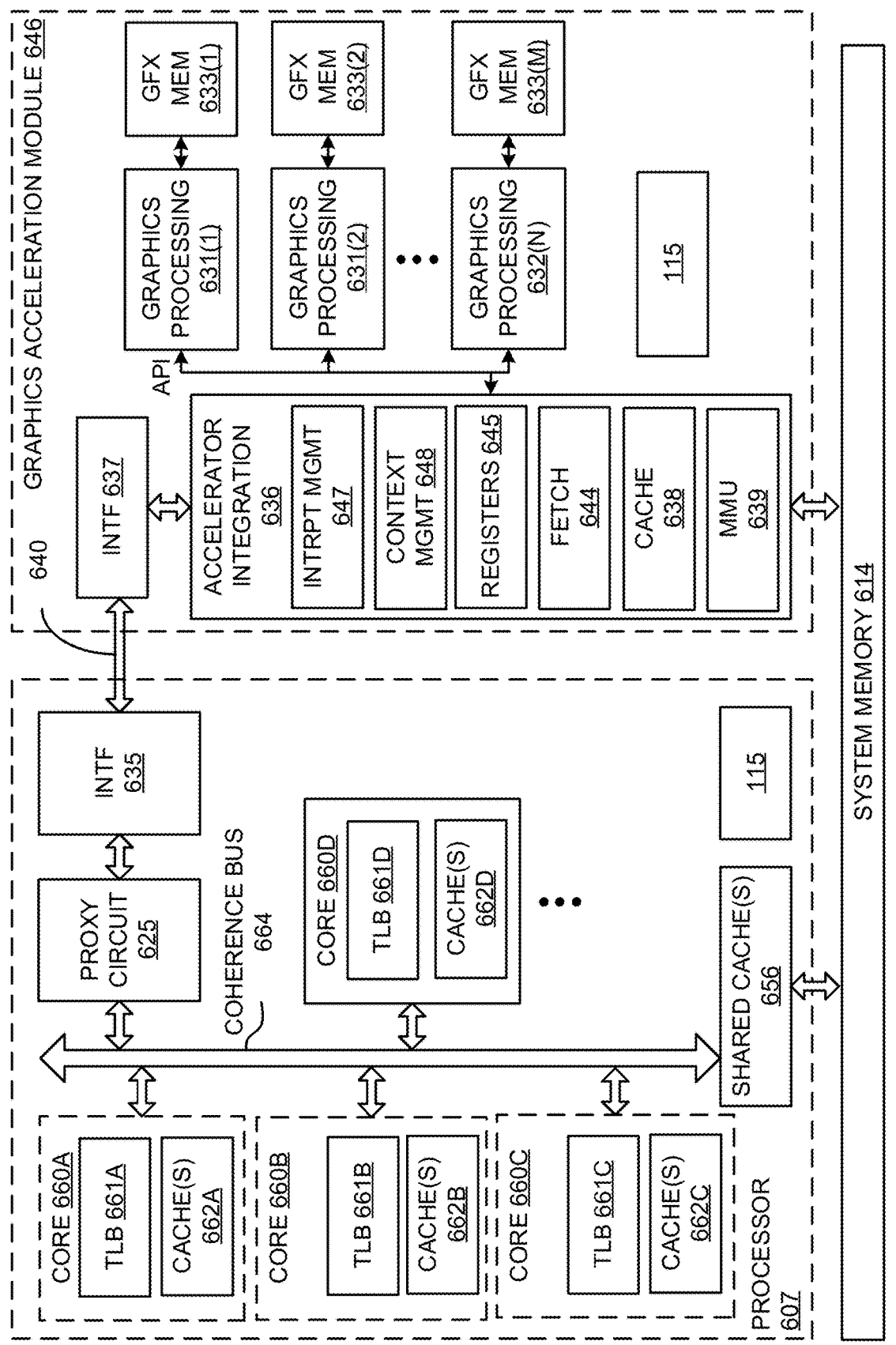

FIG. 6B illustrates additional details for an interconnection between a multi-core processor 607 and a graphics acceleration module 646 in accordance with one exemplary embodiment. In at least one embodiment, graphics acceleration module 646 may include one or more GPU chips integrated on a line card which is coupled to processor 607 via high-speed link 640 (e.g., a PCIe bus, NVLink, etc.). In at least one embodiment, graphics acceleration module 646 may alternatively be integrated on a package or chip with processor 607.

In at least one embodiment, processor 607 includes a plurality of cores 660A-660D, each with a translation lookaside buffer ("TLB") 661A-661D and one or more caches 662A-662D. In at least one embodiment, cores 660A-660D may include various other components for executing instructions and processing data that are not illustrated. In at least one embodiment, caches 662A-662D may comprise Level 1 (L1) and Level 2 (L2) caches. In addition, one or more shared caches 656 may be included in caches 662A-662D and shared by sets of cores 660A-660D. For example, one embodiment of processor 607 includes 24 cores, each with its own L1 cache, twelve shared L2 caches, and twelve shared L3 caches. In this embodiment, one or more L2 and L3 caches are shared by two adjacent cores. In at least one embodiment, processor 607 and graphics acceleration module 646 connect with system memory 614, which may include processor memories 601(1)-601(M) of FIG. 6A.

In at least one embodiment, coherency is maintained for data and instructions stored in various caches 662A-662D, 656 and system memory 614 via inter-core communication over a coherence bus 664. In at least one embodiment, for example, each cache may have cache coherency logic/circuitry associated therewith to communicate to over coherence bus 664 in response to detected reads or writes to particular cache lines. In at least one embodiment, a cache snooping protocol is implemented over coherence bus 664 to snoop cache accesses.

In at least one embodiment, a proxy circuit 625 communicatively couples graphics acceleration module 646 to coherence bus 664, allowing graphics acceleration module 646 to participate in a cache coherence protocol as a peer of cores 660A-660D. In particular, in at least one embodiment, an interface 635 provides connectivity to proxy circuit 625 over high-speed link 640 and an interface 637 connects graphics acceleration module 646 to high-speed link 640.

In at least one embodiment, an accelerator integration circuit 636 provides cache management, memory access, context management, and interrupt management services on behalf of a plurality of graphics processing engines 631(1)-631(N) of graphics acceleration module 646. In at least one embodiment, graphics processing engines 631(1)-631(N) may each comprise a separate graphics processing unit (GPU). In at least one embodiment, graphics processing engines 631(1)-631(N) alternatively may comprise different types of graphics processing engines within a GPU, such as graphics execution units, media processing engines (e.g., video encoders/decoders), samplers, and blit engines. In at least one embodiment, graphics acceleration module 646 may be a GPU with a plurality of graphics processing engines 631(1)-631(N) or graphics processing engines 631(1)-631(N) may be individual GPUs integrated on a common package, line card, or chip.

In at least one embodiment, accelerator integration circuit 636 includes a memory management unit (MMU) 639 for performing various memory management functions such as virtual-to-physical memory translations (also referred to as effective-to-real memory translations) and memory access protocols for accessing system memory 614. In at least one embodiment, MMU 639 may also include a translation lookaside buffer (TLB) (not shown) for caching virtual/effective to physical/real address translations. In at least one embodiment, a cache 638 can store commands and data for efficient access by graphics processing engines 631(1)-631(N). In at least one embodiment, data stored in cache 638 and graphics memories 633(1)-633(M) is kept coherent with core caches 662A-662D, 656 and system memory 614, possibly using a fetch unit 644. As mentioned, this may be accomplished via proxy circuit 625 on behalf of cache 638 and memories 633(1)-633(M) (e.g., sending updates to cache 638 related to modifications/accesses of cache lines on processor caches 662A-662D, 656 and receiving updates from cache 638).

In at least one embodiment, a set of registers 645 store context data for threads executed by graphics processing engines 631(1)-631(N) and a context management circuit 648 manages thread contexts. For example, context management circuit 648 may perform save and restore operations to save and restore contexts of various threads during contexts switches (e.g., where a first thread is saved and a second thread is stored so that a second thread can be execute by a graphics processing engine). For example, on a context switch, context management circuit 648 may store current register values to a designated region in memory (e.g., identified by a context pointer). It may then restore register values when returning to a context. In at least one embodiment, an interrupt management circuit 647 receives and processes interrupts received from system devices.

In at least one embodiment, virtual/effective addresses from a graphics processing engine 631 are translated to real/physical addresses in system memory 614 by MMU 639. In at least one embodiment, accelerator integration circuit 636 supports multiple (e.g., 4, 8, 16) graphics accelerator modules 646 and/or other accelerator devices. In at least one embodiment, graphics accelerator module 646 may be dedicated to a single application executed on processor 607 or may be shared between multiple applications. In at least one embodiment, a virtualized graphics execution environment is presented in which resources of graphics processing engines 631(1)-631(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 636 performs as a bridge to a system for graphics acceleration module 646 and provides address translation and system memory cache services. In addition, in at least one embodiment, accelerator integration circuit 636 may provide virtualization facilities for a host processor to manage virtualization of graphics processing engines 631(1)-631(N), interrupts, and memory management.

In at least one embodiment, because hardware resources of graphics processing engines 631(1)-631(N) are mapped explicitly to a real address space seen by host processor 607, any host processor can address these resources directly using an effective address value. In at least one embodiment, one function of accelerator integration circuit 636 is physical separation of graphics processing engines 631(1)-631(N) so that they appear to a system as independent units.

In at least one embodiment, one or more graphics memories 633(1)-633(M) are coupled to each of graphics processing engines 631(1)-631(N), respectively and N=M. In at least one embodiment, graphics memories 633(1)-633(M) store instructions and data being processed by each of graphics processing engines 631(1)-631(N). In at least one embodiment, graphics memories 633(1)-633(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 640, biasing techniques can be used to ensure that data stored in graphics memories 633(1)-633(M) is data that will be used most frequently by graphics processing engines 631(1)-631(N) and preferably not used by cores 660A-660D (at least not frequently). Similarly, in at least one embodiment, a biasing mechanism attempts to keep data needed by cores (and preferably not graphics processing engines 631(1)-631(N)) within caches 662A-662D, 656 and system memory 614.

Figure 6C:
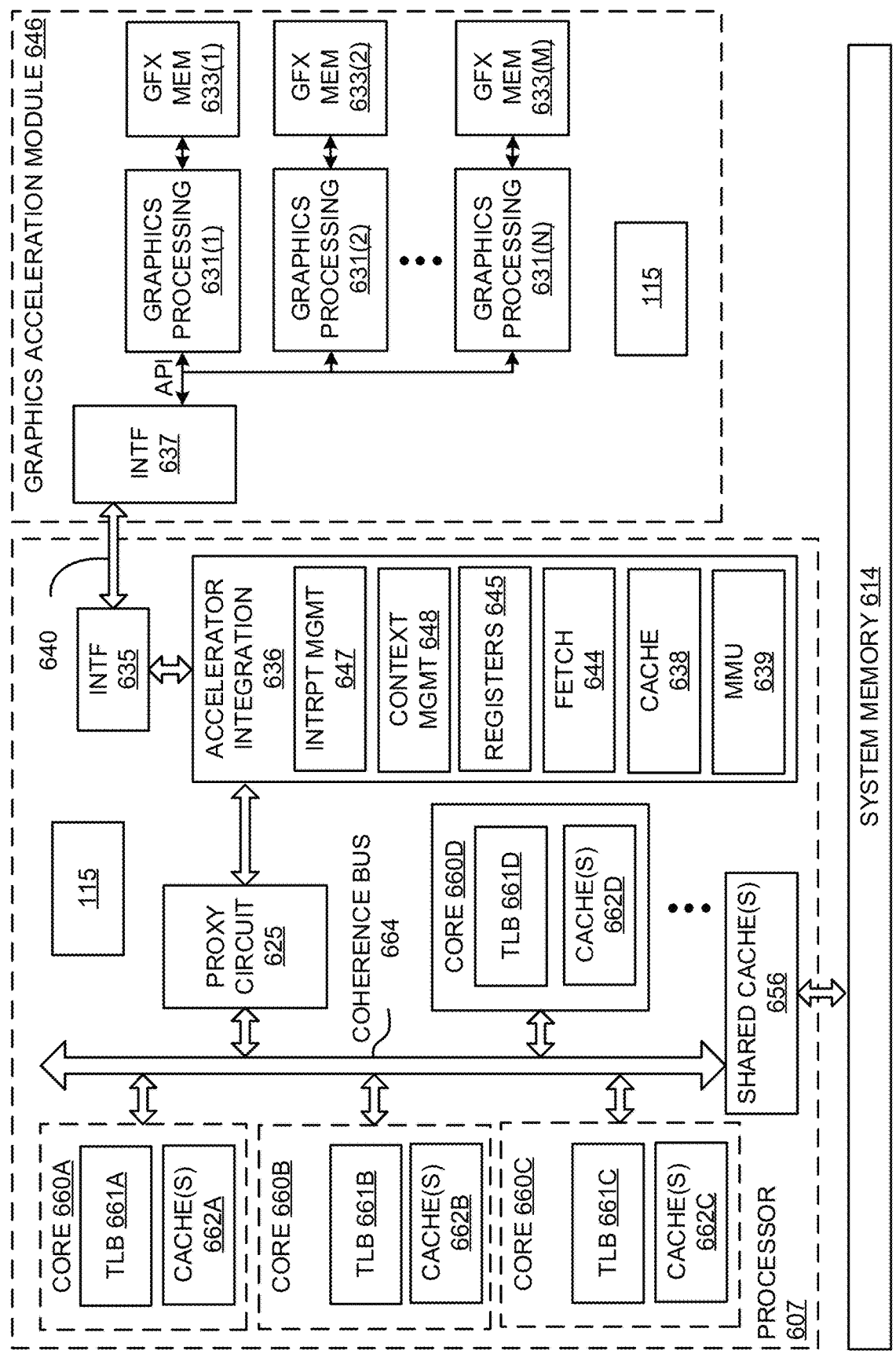

FIG. 6C illustrates another exemplary embodiment in which accelerator integration circuit 636 is integrated within processor 607. In this embodiment, graphics processing engines 631(1)-631(N) communicate directly over high-speed link 640 to accelerator integration circuit 636 via interface 637 and interface 635 (which, again, may be any form of bus or interface protocol). In at least one embodiment, accelerator integration circuit 636 may perform similar operations as those described with respect to FIG. 6B, but potentially at a higher throughput given its close proximity to coherence bus 664 and caches 662A-662D, 656. In at least one embodiment, an accelerator integration circuit supports different programming models including a dedicated-process programming model (no graphics acceleration module virtualization) and shared programming models (with virtualization), which may include programming models which are controlled by accelerator integration circuit 636 and programming models which are controlled by graphics acceleration module 646.

In at least one embodiment, graphics processing engines 631(1)-631(N) are dedicated to a single application or process under a single operating system. In at least one embodiment, a single application can funnel other application requests to graphics processing engines 631(1)-631(N), providing virtualization within a VM/partition.

In at least one embodiment, graphics processing engines 631(1)-631(N), may be shared by multiple VM/application partitions. In at least one embodiment, shared models may use a system hypervisor to virtualize graphics processing engines 631(1)-631(N) to allow access by each operating system. In at least one embodiment, for single-partition systems without a hypervisor, graphics processing engines 631(1)-631(N) are owned by an operating system. In at least one embodiment, an operating system can virtualize graphics processing engines 631(1)-631(N) to provide access to each process or application.

In at least one embodiment, graphics acceleration module 646 or an individual graphics processing engine 631(1)-631(N) selects a process element using a process handle. In at least one embodiment, process elements are stored in system memory 614 and are addressable using an effective address to real address translation technique described herein. In at least one embodiment, a process handle may be an implementation-specific value provided to a host process when registering its context with graphics processing engine 631(1)-631(N) (that is, calling system software to add a process element to a process element linked list). In at least one embodiment, a lower 16-bits of a process handle may be an offset of a process element within a process element linked list.

Figure 6D:
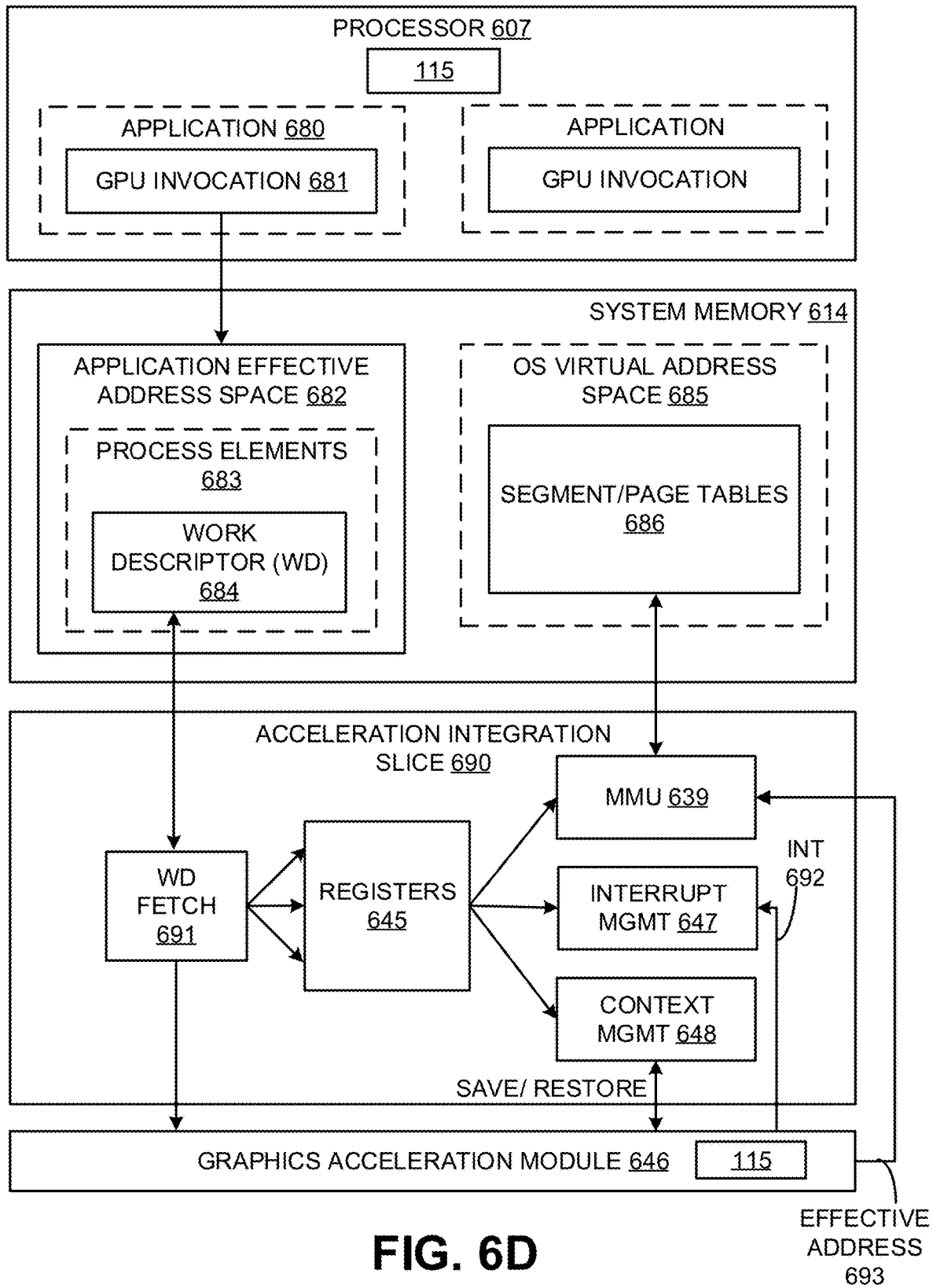

FIG. 6D illustrates an exemplary accelerator integration slice 690. In at least one embodiment, a "slice" comprises a specified portion of processing resources of accelerator integration circuit 636. In at least one embodiment, an application is effective address space 682 within system memory 614 stores process elements 683. In at least one embodiment, process elements 683 are stored in response to GPU invocations 681 from applications 680 executed on processor 607. In at least one embodiment, a process element 683 contains process state for corresponding application 680. In at least one embodiment, a work descriptor (WD) 684 contained in process element 683 can be a single job requested by an application or may contain a pointer to a queue of jobs. In at least one embodiment, WD 684 is a pointer to a job request queue in an application's effective address space 682.

In at least one embodiment, graphics acceleration module 646 and/or individual graphics processing engines 631(1)-631(N) can be shared by all or a subset of processes in a system. In at least one embodiment, an infrastructure for setting up process states and sending a WD 684 to a graphics acceleration module 646 to start a job in a virtualized environment may be included.

In at least one embodiment, a dedicated-process programming model is implementation-specific. In at least one embodiment, in this model, a single process owns graphics acceleration module 646 or an individual graphics processing engine 631. In at least one embodiment, when graphics acceleration module 646 is owned by a single process, a hypervisor initializes accelerator integration circuit 636 for an owning partition and an operating system initializes accelerator integration circuit 636 for an owning process when graphics acceleration module 646 is assigned.

In at least one embodiment, in operation, a WD fetch unit 691 in accelerator integration slice 690 fetches next WD 684, which includes an indication of work to be done by one or more graphics processing engines of graphics acceleration module 646. In at least one embodiment, data from WD 684 may be stored in registers 645 and used by MMU 639, interrupt management circuit 647 and/or context management circuit 648 as illustrated. For example, one embodiment of MMU 639 includes segment/page walk circuitry for accessing segment/page tables 686 within an OS virtual address space 685. In at least one embodiment, interrupt management circuit 647 may process interrupt events 692 received from graphics acceleration module 646. In at least one embodiment, when performing graphics operations, an effective address 693 generated by a graphics processing engine 631(1)-631(N) is translated to a real address by MMU 639.

In at least one embodiment, registers 645 are duplicated for each graphics processing engine 631(1)-631(N) and/or graphics acceleration module 646 and may be initialized by a hypervisor or an operating system. In at least one embodiment, each of these duplicated registers may be included in an accelerator integration slice 690. Exemplary registers that may be initialized by a hypervisor are shown in Table 1.

TABLE 1

Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 684 is specific to a particular graphics acceleration module 646 and/or graphics processing engines 631(1)-631(N). In at least one embodiment, it contains all information required by a graphics processing engine 631(1)-631(N) to do work, or it can be a pointer to a memory location where an application has set up a command queue of work to be completed.

Figure 6E:
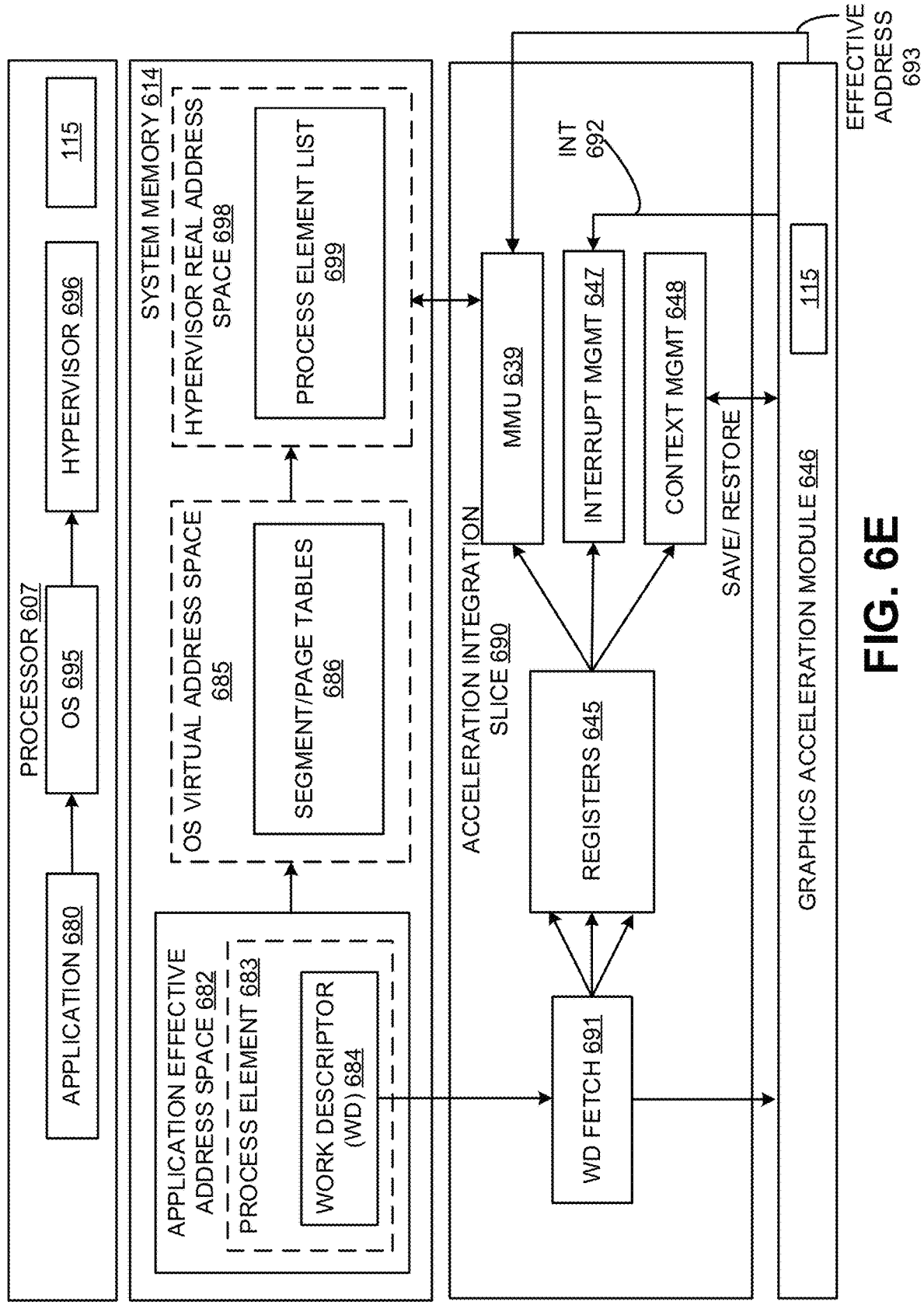
FIGS. 6E-6F illustrate a shared programming model, in accordance with some embodiments of the present disclosure.

FIG. 6E illustrates additional details for one exemplary embodiment of a shared model. This embodiment includes a hypervisor real address space 698 in which a process element list 699 is stored. In at least one embodiment, hypervisor real address space 698 is accessible via a hypervisor 696 which virtualizes graphics acceleration module engines for operating system 695.

In at least one embodiment, shared programming models allow for all or a subset of processes from all or a subset of partitions in a system to use a graphics acceleration module 646. In at least one embodiment, there are two programming models where graphics acceleration module 646 is shared by multiple processes and partitions, namely time-sliced shared and graphics directed shared.

In at least one embodiment, in this model, system hypervisor 696 owns graphics acceleration module 646 and makes its function available to all operating systems 695. In at least one embodiment, for a graphics acceleration module 646 to support virtualization by system hypervisor 696, graphics acceleration module 646 may adhere to certain requirements, such as (1) an application's job request must be autonomous (that is, state does not need to be maintained between jobs), or graphics acceleration module 646 must provide a context save and restore mechanism, (2) an application's job request is guaranteed by graphics acceleration module 646 to complete in a specified amount of time, including any translation faults, or graphics acceleration module 646 provides an ability to preempt processing of a job, and (3) graphics acceleration module 646 must be guaranteed fairness between processes when operating in a directed shared programming model.

In at least one embodiment, application 680 is required to make an operating system 695 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 646 and can be in a form of a graphics acceleration module 646 command, an effective address pointer to a user-defined structure, an effective address pointer to a queue of commands, or any other data structure to describe work to be done by graphics acceleration module 646.

In at least one embodiment, an AMR value is an AMR state to use for a current process. In at least one embodiment, a value passed to an operating system is similar to an application setting an AMR. In at least one embodiment, if accelerator integration circuit 636 (not shown) and graphics acceleration module 646 implementations do not support a User Authority Mask Override Register (UAMOR), an operating system may apply a current UAMOR value to an AMR value before passing an AMR in a hypervisor call. In at least one embodiment, hypervisor 696 may optionally apply a current Authority Mask Override Register (AMOR) value before placing an AMR into process element 683. In at least one embodiment, CSRP is one of registers 645 containing an effective address of an area in an application's effective address space 682 for graphics acceleration module 646 to save and restore context state. In at least one embodiment, this pointer is optional if no state is required to be saved between jobs or when a job is preempted. In at least one embodiment, context save/restore area may be pinned system memory.

Upon receiving a system call, operating system 695 may verify that application 680 has registered and been given authority to use graphics acceleration module 646. In at least one embodiment, operating system 695 then calls hypervisor 696 with information shown in Table 3.

TABLE 3

OS to Hypervisor Call Parameters

| Parameter # | Description |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 696 verifies that operating system 695 has registered and been given authority to use graphics acceleration module 646. In at least one embodiment, hypervisor 696 then puts process element 683 into a process element linked list for a corresponding graphics acceleration module 646 type. In at least one embodiment, a process element may include information shown in Table 4.

TABLE 4

Process Element Information

| Element # | Description |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 690 registers 645.

Figure 6F:
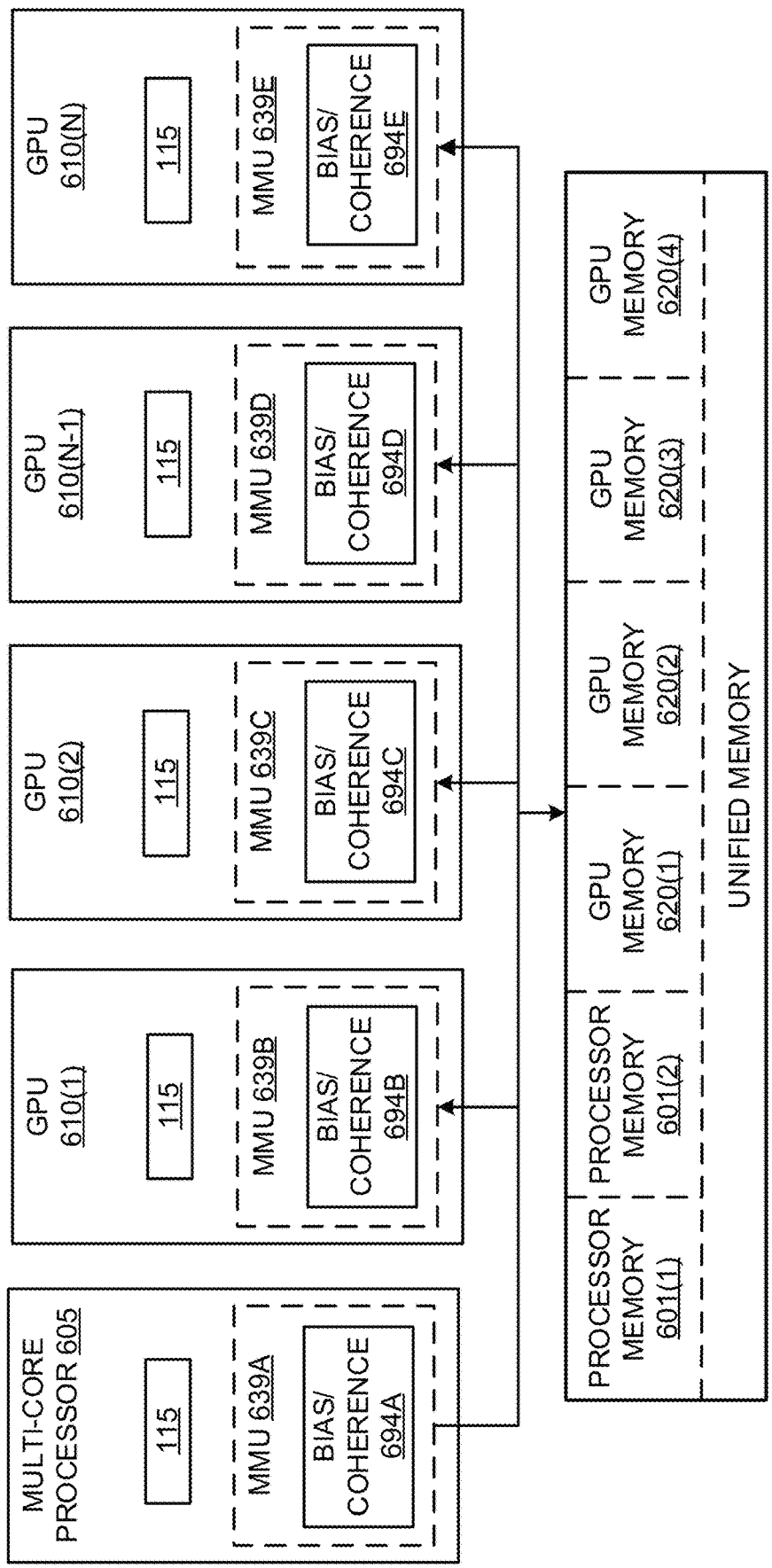

As illustrated in FIG. 6F, in at least one embodiment, a unified memory is used, addressable via a common virtual memory address space used to access physical processor memories 601(1)-601(N) and GPU memories 620(1)-620(N). In this implementation, operations executed on GPUs 610(1)-610(N) utilize a same virtual/effective memory address space to access processor memories 601(1)-601(M) and vice versa, thereby simplifying programmability. In at least one embodiment, a first portion of a virtual/effective address space is allocated to processor memory 601(1), a second portion to second processor memory 601(N), a third portion to GPU memory 620(1), and so on. In at least one embodiment, an entire virtual/effective memory space (sometimes referred to as an effective address space) is thereby distributed across each of processor memories 601 and GPU memories 620, allowing any processor or GPU to access any physical memory with a virtual address mapped to that memory.

In at least one embodiment, bias/coherence management circuitry 694A-694E within one or more of MMUs 639A-639E ensures cache coherence between caches of one or more host processors (e.g., 605) and GPUs 610 and implements biasing techniques indicating physical memories in which certain types of data should be stored. In at least one embodiment, while multiple instances of bias/coherence management circuitry 694A-694E are illustrated in FIG. 6F, bias/coherence circuitry may be implemented within an MMU of one or more host processors 605 and/or within accelerator integration circuit 636.

One embodiment allows GPU memories 620 to be mapped as part of system memory, and accessed using shared virtual memory (SVM) technology, but without suffering performance drawbacks associated with full system cache coherence. In at least one embodiment, an ability for GPU memories 620 to be accessed as system memory without onerous cache coherence overhead provides a beneficial operating environment for GPU offload. In at least one embodiment, this arrangement allows software of host processor 605 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 620 without cache coherence overheads can be critical to execution time of an offloaded computation. In at least one embodiment, in cases with substantial streaming write memory traffic, for example, cache coherence overhead can significantly reduce an effective write bandwidth seen by a GPU 610. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 620, with or without a bias cache in a GPU 610 (e.g., to cache frequently/recently used entries of a bias table). Alternatively, in at least one embodiment, an entire bias table may be maintained within a GPU.

In at least one embodiment, a bias table entry associated with each access to a GPU attached memory 620 is accessed prior to actual access to a GPU memory, causing following operations. In at least one embodiment, local requests from a GPU 610 that find their page in GPU bias are forwarded directly to a corresponding GPU memory 620. In at least one embodiment, local requests from a GPU that find their page in host bias are forwarded to processor 605 (e.g., over a high-speed link as described herein). In at least one embodiment, requests from processor 605 that find a requested page in host processor bias complete a request like a normal memory read. Alternatively, requests directed to a GPU-biased page may be forwarded to a GPU 610. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 605 bias to GPU bias, but is not for an opposite transition.

In at least one embodiment, cache coherency is maintained by temporarily rendering GPU-biased pages uncacheable by host processor 605. In at least one embodiment, to access these pages, processor 605 may request access from GPU 610, which may or may not grant access right away. In at least one embodiment, thus, to reduce communication between processor 605 and GPU 610 it is beneficial to ensure that GPU-biased pages are those which are required by a GPU but not host processor 605 and vice versa.

Figure 7A:
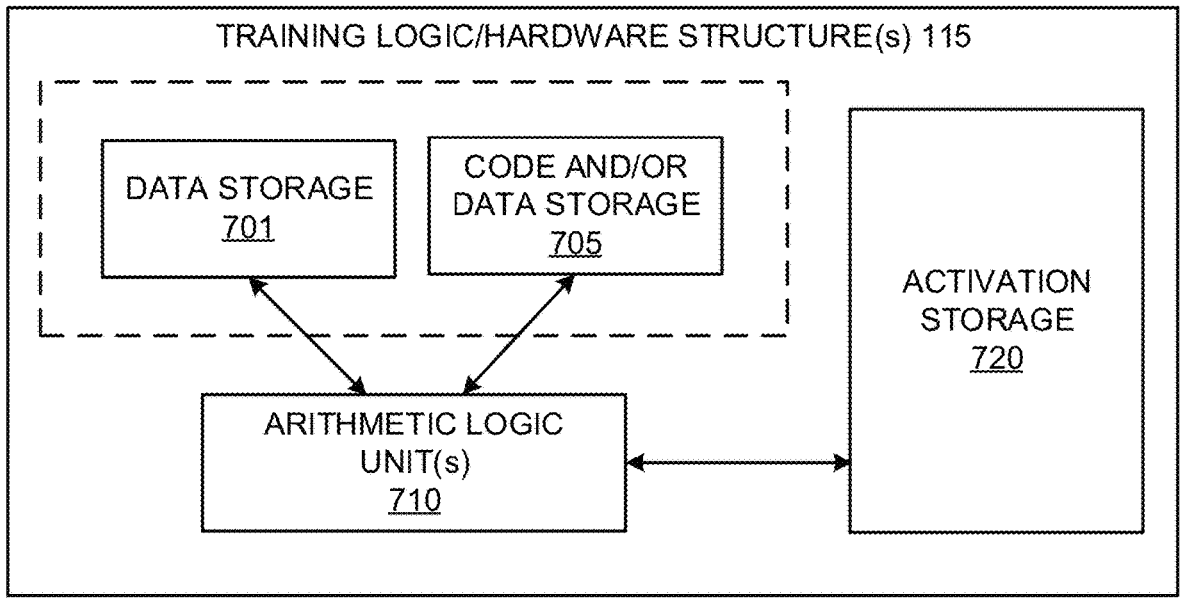
FIGS. 7A-7B each illustrate inference and/or training logic in accordance with some embodiments of the disclosure.

Hardware structure(s) 115 are used to perform one or more embodiments. FIG. 7A illustrates inference and/or training logic 115 used to perform inferencing and/or training operations associated with one or more embodiments. Details regarding inference and/or training logic 115 are provided below in conjunction with FIGS. 7A and/or 7B.

In at least one embodiment, inference and/or training logic 115 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 115 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 115 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 115 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 7A may be used in conjunction with central processing unit ("CPU") hardware, graphics processing unit ("GPU") hardware or other hardware, such as field programmable gate arrays ("FPGAs").

Figure 7B:
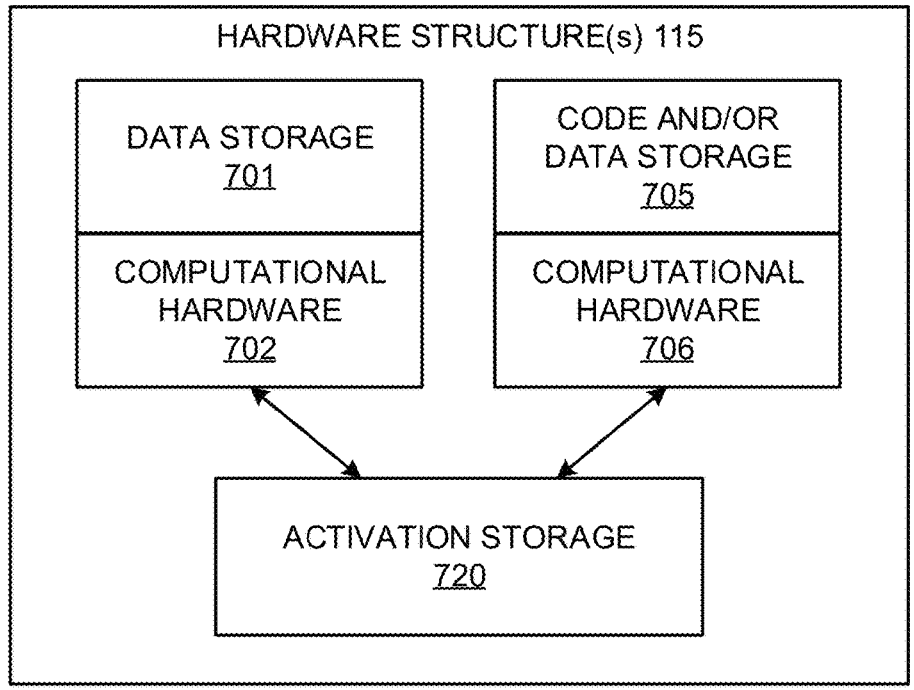

FIG. 7B illustrates inference and/or training logic 115, according to at least one embodiment. In at least one embodiment, inference and/or training logic 115 may include, without limitation, hardware logic in which computational resources are dedicated or otherwise exclusively used in conjunction with weight values or other information corresponding to one or more layers of neurons within a neural network. In at least one embodiment, inference and/or training logic 115 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 115 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 115.

Figure 8:
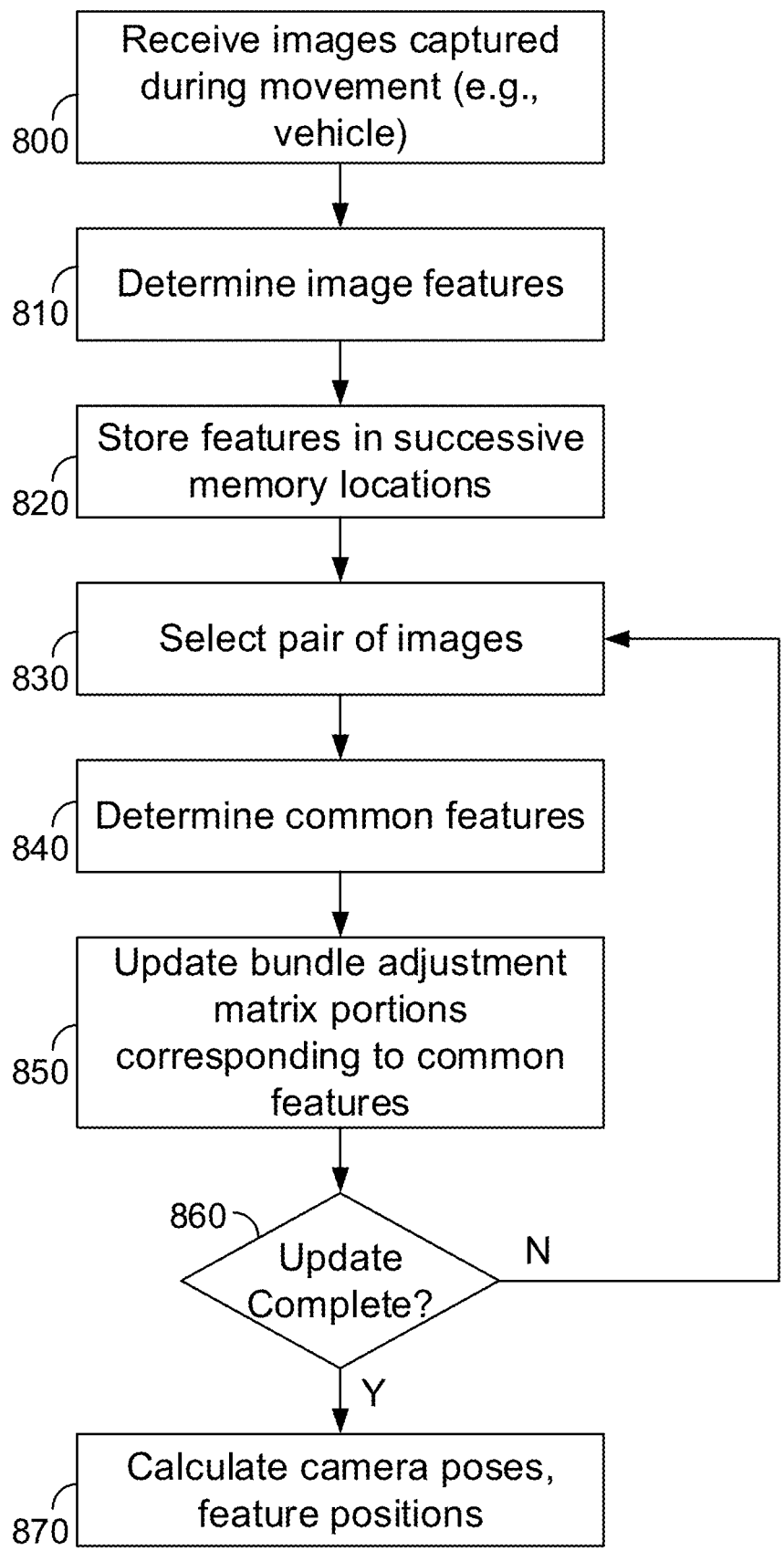
FIG. 8 is a flowchart illustrating an exemplary rapid visual odometry process, according to some embodiments of the disclosure.

FIG. 8 is a flowchart illustrating an exemplary rapid visual odometry process, according to some embodiments of the disclosure. Here, cameras of a system such as vehicle 400 may generate or capture images during system movement, and transmit them to computing devices 300 of the system, e.g., vehicle 400 processors described above (Step 800). These processors may then determine features P of each received image (Step 810). Features P may be any features, such as points of a point cloud that correspond to visual features of the received images. Such features P may also be determined in any manner. As one example, points corresponding to visible features may be determined by machine learning methods employing one or more machine learning models constructed and trained as in FIGS. 7A-B. For instance, one or more above described CNNs may be constructed and trained to recognize physical objects and assign a point to relevant or desired features thereof, such as boundaries, edges, or corners of detected spatial objects. Points, or features P, identified in this manner may be characterized by their (x, y) location within their image.

Features P are then stored in memory such as off-chip memory, in successive memory locations (Step 820). As above, features P are stored in a manner facilitating coalesced memory access operations. Accordingly, in some embodiments of the disclosure, (x, y) locations of features P are stored in successive or neighboring memory addresses as they are determined.

In some embodiments of the disclosure, features P are identified prior to storage, so as to prevent storage of duplicate features in different memory locations. Feature identification may be accomplished via any method or manner. As one example, the above described CNNs described in connection with Step 810 may be further constructed and trained to label identified feature points P as belonging to particular recognized objects, and corresponding to the same object portions according to recognized object shapes. Features P recognized as being identical to other previously-identified features of previous images may be appended to the memory column allocated for that previously-identified feature, as in FIG. 2C. Accordingly, each unique identified feature may be stored in its own column of memory, with additional instances of that feature appended to the same column.

As above, a processor track may be allocated for each feature, i.e., each memory column, with successive tracks allocated for successive features/columns, such that adjacent tracks access adjacent memory columns for processing of their features.

The information in received images may then be used to update bundle adjustment values. As above, for efficiency and speed purposes, updating may be performed by image pair and features common to the images of that pair, so that the set of update values is sufficiently small to be held in register memory. In particular, a pair of images is selected from among the set of received images (Step 830), and common features may then be determined (Step 840). Determination of features P common to a particular pair of images may be performed in any manner. As one example, an array or list may be kept for each received image, with elements of the list corresponding to the numerical order of features identified in that image. That is, each list position corresponds to a unique feature, in increasing order of identification. Thus, for example, the first list element may correspond to the first feature identified, e.g., $P_0$, the second list element may correspond to $P_1$, the third to $P_2$, etc., with each image's list having the same correspondences. List elements may be set to a nonzero value such as binary 1 when its corresponding feature is present in that particular image. Thus, in the example of FIG. 1, the list for image $C_0$ may have a binary 1 in the first and second elements, to correspond to the presence of identified features $P_0$ and $P_1$. Likewise, the list for image $C_1$ may have a binary 0 in its first element, as $P_0$ was not detected in image $C_1$, but may have a binary 1 in its second, third, fourth, and fifth elements corresponding to the presence of features $P_1$, $P_2$, $P_3$, and $P_4$. Similarly, as image $C_5$ has only identified points $P_6$-$P_{11}$, its list would contain binary 0 in its first six elements, and binary 1 in elements seven through twelve.

It may be observed that the determination of features P common to each image of an image pair may be accomplished by performing an elementwise logical AND of the lists for that pair of images. As corresponding elements represent the same feature, operations resulting in a binary 1 thus correspond to features present in both images.

Common features having been identified, appropriate portions of bundle adjustment matrices may be updated (Step 850). As above, portions of the A matrix corresponding to the selected images are updated using features common to both images. Common features are identified by list as above, and corresponding threads are selected. The threads in turn retrieve their features from memory via coalesced memory access operations, and calculate updated values of the A matrix that are stored in registers. When updates are completed, register contents may be written to off-chip memory in a single operation or set of operations, thus reducing the time required in performing bundle adjustment updates.

If the update process is complete (Step 860) and no further images exist for which to carry out A matrix updates, the updated A matrix can be used to calculate dC and dP, i.e., camera poses and feature positions (Step 870) according to equation (3). If, however, further updates must be performed, the process instead returns to Step 830, and another pair of images is selected for A matrix updates.

One of ordinary skill in the art will observe that, although bundle adjustment processes have been described above in connection with vehicles, embodiments of the disclosure are not limited to this application, and instead encompass any application in which camera pose and/or feature location may be desired. For example, processes of embodiments of the disclosure may be employed to determine camera poses and/or locate identified features for cameras employed in motion capture, stop-motion and other visual effects, medical imaging, and the like.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, image features may be identified in any manner, as can features common to two or more images. Any number of bundle adjustment values capable of being held in register memory may be calculated before register contents are written to memory. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of determining sensor parameters, the method comprising:
   selecting a pair of representations generated from sensor data;
   for the selected pair, identifying features common to each representation of the selected pair using parallel processing circuitry;
   for each of the features, determining corresponding values of a bundle adjustment process, and storing the determined values in a first memory that is a register memory;
   writing the determined values to a second memory responsive to determining the corresponding values for at least one of the features; and
   determining at least one sensor parameter by performing the bundle adjustment process using the determined values.

2. The method of claim 1, further comprising storing the identified features at sequential addresses of a memory.

3. The method of claim 2, further comprising sequentially allocating a processor thread for each of the stored features.

4. The method of claim 1, wherein the determining corresponding values of the bundle adjustment process further comprises determining corresponding values of a portion of a Hessian matrix, the portion corresponding to the selected pair of representations.

5. The method of claim 4, wherein the method further comprises allocating a processing element of a graphics processing unit (GPU) for determining the corresponding values of the portion of the Hessian matrix.

6. The method of claim 1, wherein the representations comprise images generated using a camera, wherein the features comprise image points.

7. The method of claim 1, wherein the identifying features common to each representation of the selected pair further comprises, for each representation of the selected pair of representations, assembling a list of features of each representation, and comparing the lists of the selected pair of representations to determine common elements of the lists.

8. The method of claim 1, wherein the sensor parameters correspond to camera parameters, and wherein at least one sensor parameter comprises at least one of: one or more camera poses and one or more feature positions.

9. The method of claim 1, wherein the determining at least one parameter of the sensor further comprises determining positions of the features by performing the bundle adjustment process using the determined values.

10. A method of determining camera poses and feature positions, the method comprising:

performing a bundle adjustment process using parallel processing circuitry, by:
- identifying features common to both images of a pair of images;
- using a first memory that is a register memory, determining one or more values of a matrix of the bundle adjustment process corresponding to the identified common features;
- after the determining, writing the determined values from the first memory to a second memory; and
- determining at least one of the poses of the camera using the determined values.

11. The method of claim 10, further comprising storing the identified features at sequential addresses of a memory.

12. The method of claim 11, further comprising sequentially allocating a processor thread for each of the stored features.

13. The method of claim 10, wherein the matrix is a Hessian matrix.

14. The method of claim 10, wherein the method further comprises allocating a processing element of a graphics processing unit (GPU) for performing the determining one or more values of the matrix of the bundle adjustment process corresponding to the identified common features.

15. The method of claim 10, wherein the features comprise image points.

16. The method of claim 10, wherein the identifying further comprises, for each image of the pair of images, assembling a list of features of the each image, and comparing the lists of the selected pair of images to determine common elements of the lists.

17. The method of claim 10, wherein the images are images of a camera of a vehicle.

18. The method of claim 10, wherein the determining at least the poses of the camera further comprises determining positions of the features by performing the bundle adjustment process using the determined values.

19. A system for determining sensor parameters, the system comprising:
parallel processing circuitry configured to:
- select a pair of representations generated from sensor data;
- for the selected pair, identify features common to each representation of the selected pair using the parallel processing circuitry;
- for each of the features, determine corresponding values of a bundle adjustment process, and store the determined values in a first memory that is a register memory;
- write the determined values to a second memory responsive to determining the corresponding values for at least one of the features; and
- determine at least one sensor parameter by performing the bundle adjustment process using the determined values.

20. The system of claim 19, wherein the parallel processing circuitry is further configured to store the identified features at sequential addresses of a memory.

21. The system of claim 20, wherein the parallel processing circuitry is further configured to sequentially allocate a processor thread for each of the stored features.

22. The system of claim 19, wherein the determining corresponding values of the bundle adjustment process further comprises determining corresponding values of a portion of a Hessian matrix, the portion corresponding to the selected pair of representations.

23. The system of claim 22, wherein the parallel processing circuitry is further configured to allocate a processing element of a graphics processing unit (GPU) for determining the corresponding values of the portion of the Hessian matrix.

24. The system of claim 19, wherein the representations comprise images generated using a camera, wherein the features comprise image points.

25. The system of claim 19, wherein the identifying features common to each representation of the selected pair further comprises, for each representation of the selected pair of representations, assembling a list of features of each representation, and comparing the lists of the selected pair of representations to determine common elements of the lists.

26. The system of claim 19, wherein the sensor parameters correspond to camera parameters, and wherein at least one sensor parameter comprises at least one of: one or more camera poses and one or more feature positions.

27. The system of claim 19, wherein the determining at least one parameter of the sensor further comprises determining positions of the features by performing the bundle adjustment process using the determined values.

* * * * *